United States Patent
Mostoller et al.

(10) Patent No.: US 9,347,822 B2
(45) Date of Patent: May 24, 2016

(54) PHOTOCELL RECEPTACLE HAVING VARIABLY POSITIONABLE CAP AND BASE

(71) Applicant: Tyco Electronics Corporation, Berwyn, PA (US)

(72) Inventors: Matthew Edward Mostoller, Hummelstown, PA (US); Christopher George Daily, Harrisburg, PA (US); Edward John Howard, Millersburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 50 days.

(21) Appl. No.: 14/272,182

(22) Filed: May 7, 2014

(65) Prior Publication Data

US 2015/0323380 A1     Nov. 12, 2015

(51) Int. Cl.
*G01J 1/42* (2006.01)
*G01J 1/02* (2006.01)
*H05B 37/02* (2006.01)

(52) U.S. Cl.
CPC .............. *G01J 1/0266* (2013.01); *G01J 1/0271* (2013.01); *G01J 1/4204* (2013.01); *H05B 37/0218* (2013.01)

(58) Field of Classification Search
CPC . F21V 15/01; F21V 23/0442; F21V 23/0464; G01J 1/0271
See application file for complete search history.

(56) References Cited

U.S. PATENT DOCUMENTS

| 3,274,392 | A | 9/1966 | Harling |
| 4,477,143 | A | 10/1984 | Taylor |
| 5,941,630 | A | 8/1999 | Finke et al. |
| 2013/0044444 | A1* | 2/2013 | Creighton ............. G01J 1/0271 361/752 |

FOREIGN PATENT DOCUMENTS

WO    2007 / 003032 A1    1/2007

OTHER PUBLICATIONS

International Search Report, International Application No. PCT/US2015/028983, International Filing Date, May 4, 2015.

* cited by examiner

*Primary Examiner* — Tony Ko

(57) ABSTRACT

A photocell receptacle includes a base configured to be fixedly mounted to a housing of a light fixture. The base has an opening providing access to the interior of the housing of the light fixture. The base has a base locking feature. The photocell receptacle includes a cap having a cap locking feature. The cap locking feature operably engaging the base locking feature to secure the cap to the base. The cap is variably positionable at different angular positions relative to the base. The cap has contact channels holding electrical contacts configured to be electrically connected to corresponding contacts of a photocell.

19 Claims, 13 Drawing Sheets

PHOTOCELL RECEPTACLE HAVING VARIABLY POSITIONABLE CAP AND BASE

BACKGROUND OF THE INVENTION

The subject matter herein relates generally to photocell receptacles.

On street lights and parking lot lights, photocells and the corresponding mating receptacles are typically used to turn the lights on and off based upon the ambient light from the sun. To ensure optimum photocell efficiency, it is important that the photocell light sensor points generally in the north direction. The aiming of the photocell is accomplished by drilling holes in the light fixture in proper positions, which is difficult and time consuming. Some photocell receptacles have special mounting clips that allow orienting of the receptacle, however such mounting clips are difficult to install and manipulate. Also, such mounting clips tend to fail over time allowing the photocell to migrate and move out of true position over time.

A need remains for a photocell receptacle that allows aiming of the photocell with ease of field use and assembly.

BRIEF DESCRIPTION OF THE INVENTION

In one embodiment, a photocell receptacle is provided including a base configured to be fixedly mounted to a housing of a light fixture. The base has an opening providing access to the interior of the housing of the light fixture. The base has a base locking feature. The photocell receptacle includes a cap having a cap locking feature. The cap locking feature operably engaging the base locking feature to secure the cap to the base. The cap is variably positionable at different angular positions relative to the base. The cap has contact channels holding electrical contacts configured to be electrically connected to corresponding contacts of a photocell.

Optionally, the base locking feature may be one of a plurality of base locking features. The cap locking feature being engagable with the plurality of base locking features to change the angular position of the cap relative to the base. The base locking feature may include a notch and the cap locking feature may include a protrusion received in the notch to stop rotation of the cap relative to the base. The notch may be a bayonet-style notch with a locking cavity and the protrusion may be locked in the locking cavity. The base locking feature may be a protrusion and the cap locking feature may include a notch receiving the protrusion to stop rotation of the cap relative to the base.

Optionally, the base may include a latch coupled to the cap to axially secure the cap relative to the base. The cap locking feature and base locking feature may be engaged to rotatably secure the cap relative to the base.

Optionally, the photocell receptacle may include a biasing member between the base and the cap. The biasing member may bias the cap into a locked positioned in which the cap locking feature engages the base locking feature.

Optionally, the base locking features may include a plurality of teeth with spaces between the teeth. The cap locking feature may include a protrusion selectively receivable in the spaces to control the angular position of the cap relative to the base. The cap locking feature may include a plurality of teeth internested with the teeth of the base locking feature.

Optionally, the base may include a top and a bottom. The bottom may be mounted to the housing of the light fixture. The base may include a ledge having a bottom surface. The base locking feature may include a plurality of notches in the bottom surface of the ledge. The cap locking feature may include a protrusion selectively receivable in the notches to control the angular position of the cap relative to the base. A biasing member may be positioned between the base and the cap. The biasing member may press the cap upward relative to the base to force the protrusion into the associated notch.

Optionally, the base may include a plurality of anti-rotation posts extending from the top. The cap may include a plurality of anti-rotation bores that receive corresponding anti-rotation posts to resist rotation of a cap relative to the base. A biasing member may be positioned between the base and the cap. The biasing member may normally press the cap away from the top of the base such that the anti-rotation posts are disengaged from the anti-rotation bores.

Optionally, the cap may include a head and a neck extending from the head. The contact channels may be open at a top of the head to receive the electrical contacts and the contacts of the photocell. The neck may be received in the opening of the base. The cap locking features may be provided on the head.

Optionally, the photocell receptacle may include an over-rotation feature on at least one of the base and the cap to limit rotation of the cap relative to the base to less than 360°. The photocell receptacle may include a retention clip held by the base. The cap may have a first clip groove and a second clip groove vertically offset from the first clip groove. The cap may be positionable in an unlocked position in which the first clip groove receives the retention clip and a locked position in which the second clip groove receives the retention clip. The cap locking feature may engage the base locking feature in the locked position to limit rotation of the cap with respect to the base. The cap locking feature may be disengaged from the base locking feature in the unlocked position allowing rotation of the cap with respect to the base.

Optionally, the photocell receptacle may include a biasing member coupled to the cap and positioned in the housing of the light fixture. The biasing member may be configured to engage the housing to bias the cap to a locked positioned in which the cap locking feature engages the base locking feature.

Optionally, the photocell receptacle may include a direction indicator on a top of the cap. The cap may be rotated until the direction indicator is positioned generally north.

DETAILED DESCRIPTION OF THE INVENTION

Figure 1:
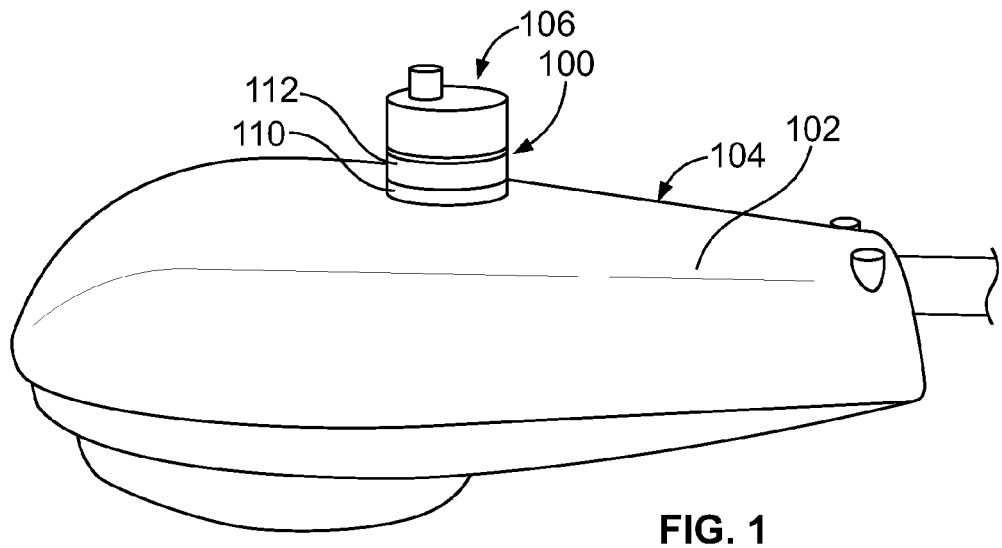
FIG. 1 illustrates a photocell receptacle formed in accordance with an exemplary embodiment.

FIG. 1 illustrates a photocell receptacle 100 formed in accordance with an exemplary embodiment. The photocell receptacle 100 is mounted to a housing 102 of a light fixture 104, such as a roadway light, a parking lot light, a street light, and the like. The photocell receptacle 100 holds a photocell 106 that is used to turn the light fixture 104 on or off depending upon light levels. The photocell 106 is a light sensor used to detect ambient light from the sun. For proper operation, it is desirable that the photocell 106 be aimed in a particular direction to ensure optimum photocell efficiency, such as facing north. The photocell receptacle 100 is rotatable to allow aiming of the photocell 106 in the desired direction.

The photocell receptacle 100 includes a base 110 that is fixedly mounted to the housing 102 of the light fixture 104. The photocell receptacle 100 includes a cap 112 rotatably coupled to the base 110. The photocell 106 is mechanically and electrically coupled to the cap 112, and thus the photocell 106 may be positioned by positioning the cap 112 relative to the base 110. Once positioned, the cap 112 may be locked in position relative to the base 110 to maintain the position of the photocell 106. Optionally, the cap 112 may be positioned relative to the base 110 prior to the photocell 106 being connected to the cap 112. Alternatively, the cap 112 may be positionable with the photocell 106 mounted thereto.

In an exemplary embodiment, the base 110 includes one or more base locking features and the cap 112 includes one or more cap locking features that engage corresponding base locking features to lock the angular position of the cap 112 relative to the base 110. The cap 112 may be unlocked from the base 110 to change the angular position of the cap 112 relative to the base 110 and then the cap 112 may again be locked in position relative to the base 110.

Figure 2:
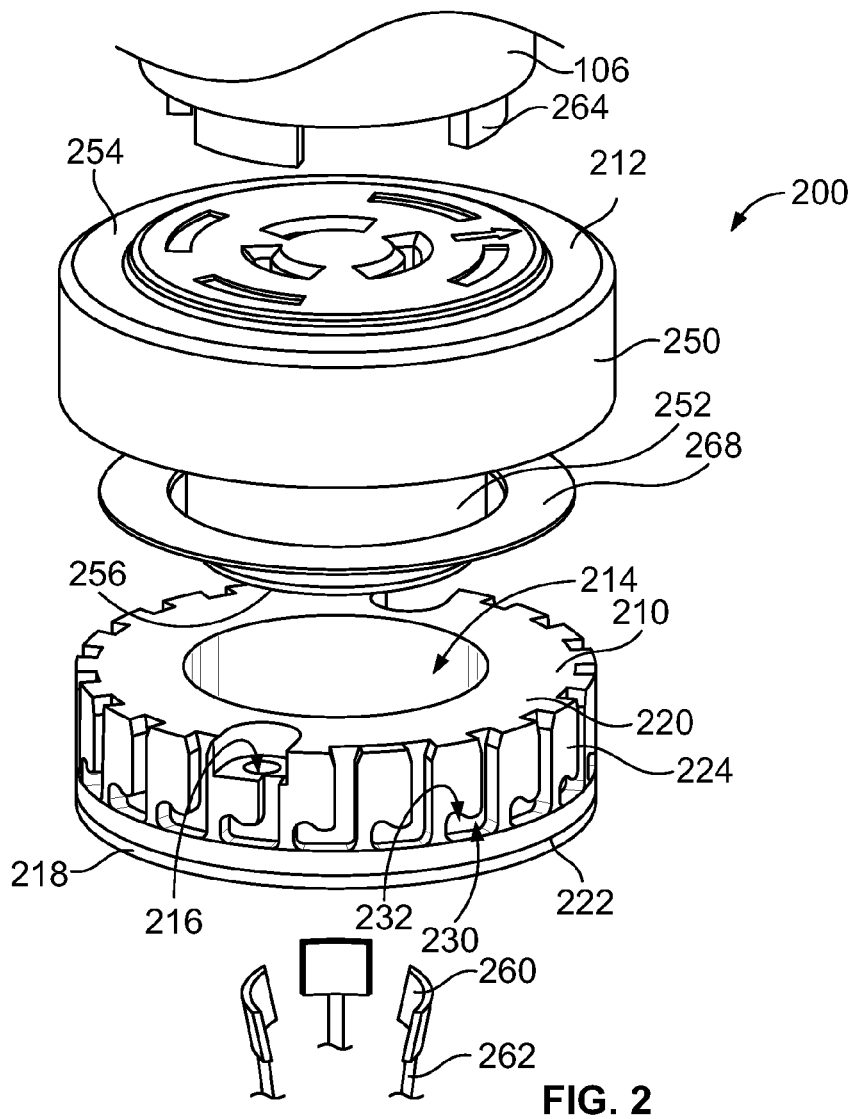
FIG. 2 is an exploded view of a photocell receptacle formed in accordance with an exemplary embodiment.
Figure 3:
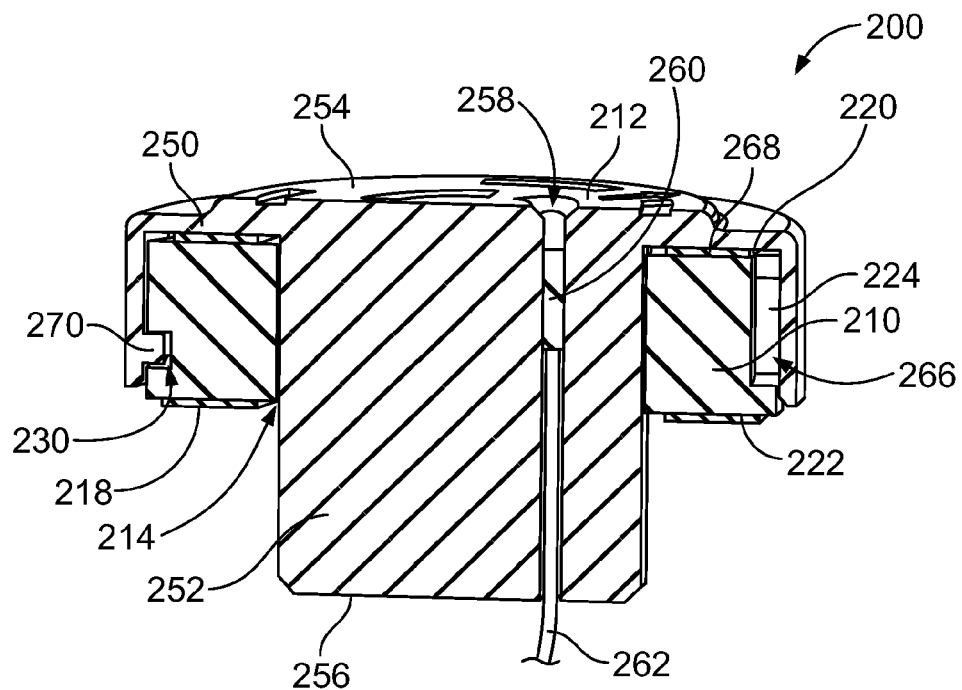
FIG. 3 is a cross sectional view of the photocell receptacle shown in FIG. 2 in an assembled state.

FIG. 2 is an exploded view of a photocell receptacle 200 formed in accordance with an exemplary embodiment. FIG. 3 is a cross sectional view of the photocell receptacle 200 in an assembled state. The photocell receptacle 200 is similar to the photocell receptacle 100 in some aspects. The photocell 106 is configured to be coupled to the photocell receptacle 200. The photocell receptacle 200 includes a base 210 and a cap 212 that is configured to be rotatably coupled to the base 210 and positionable at different angular positions relative to the base 210 to control an angular orientation of the photocell 106.

The base 210 includes an opening 214 that provides access to the interior of the housing 102 of the light fixture 104 (both shown in FIG. 1). For example, wires may pass through the opening 214 between the light fixture 104 and the photocell 106 for electrical connection of the photocell 106 to the light of the light fixture 104. The base 210 includes fastener openings 216 passing therethrough that are configured to receive fasteners (not shown) used to secure the base 210 to the housing 102 of the light fixture 104. The base 210 may be secured to the housing 102 by other mounting features in alternative embodiments. In an exemplary embodiment, a seal 218 may be provided between the base 210 and the housing 102 to seal the light fixture 104 from environmental containments such as water, debris, and the like.

The base 210 includes a top 220 and a bottom 222 opposite the top 220. The bottom 222 is configured to be secured to the housing 102. The base 210 includes a side wall 224 between the top 220 and the bottom 222. In an exemplary embodiment, the base 210 is circular to allow easy rotation of the cap 212 relative to the base 210. However, the base 210 may have other shapes and alternative embodiments.

The base 210 includes at least one base locking feature 230 used to lock the cap 212 relative to the base 210. In an exemplary embodiment, the base 210 includes a plurality of base locking features 230 at different angular positions about the base 210 to allow for positioning of the cap 212 at different angular positions relative to the base 210. In the illustrated embodiment, the base locking features 230 are notches, and may be referred to hereinafter as notches 230. Optionally, the notches 230 may be bayonet-style notches having locking cavities 232. For example, the notches 230 are J shaped having a vertical segment, a horizontal segment and the locking cavity 232 at the end of the horizontal segment. The notches 230 may have other shapes in alternative embodiments.

The cap 212 has a head 250 and a neck 252 extending from the head 250. The head 250 is provided at a top 254 of the cap 212. The neck 252 is provided at a bottom 256 of the cap 212. The neck 252 is configured to be received in the opening 214 of the base 210. The head 250 has a larger diameter than the neck 252. In an exemplary embodiment, the head 250 and neck 252 are circular to allow easy rotation of the cap 212 relative to the base 210. However, other shapes are possible in alternative embodiment.

The cap 212 has a plurality of contact channels 258 extending through the head 250 and/or the neck 252. The contact channels 258 hold electrical contacts 260 provided at ends of wires 262. The contact channels 258 receive corresponding contacts 264 of the photocell 106, which are electrically connected to the electrical contacts 260 in the contact channels 258. Optionally, the contact channels 258 may be curved to receive curved contacts 264 and/or electrical contacts 260. In an exemplary embodiment, the photocell 106 may be twisted or rotated to lock the contacts 264 in the contact channels 258. For example, the contacts 264 are initially loaded into the contact channels 258 in a vertical direction and the photocell 106 is rotated, such as approximately 35 degrees to lock the contacts 264 in the contact channels 258 and thus lock the photocell 106 to the cap 212. Other types of mating arrangements between the photocell 106 and the cap 212 are possible in alternative embodiments.

The head 250 includes a pocket 266. When the cap 212 is coupled to the base 210, the base 210 is received in the pocket 266. The pocket 266 may be open at the bottom of the head 250.

Optionally, a gasket 268 may be received in the pocket 266 and positioned between the cap 212 and the base 210. The gasket 268 may provide sealing between the base 210 and the cap 212. In an exemplary embodiment, the gasket 268 is compressible and may provide compliance between the base 210 and the cap 212. As such, the gasket 268 may define a biasing member, and may be referred to hereinafter as biasing member 268. The biasing member 268 may be biased against the cap 212 to force the cap 212 to lock in position relative to the base 210. For example, the gasket 268 may press the cap 212 upward.

In an exemplary embodiment, the cap 212 includes one or more cap locking features 270. The cap locking feature 270 is configured to engage a corresponding base locking feature 230 to lock the cap 212 to the base 210. In the illustrated embodiment, the cap locking feature 270 is a protrusion, and may be referred to herein after as protrusion 270. In the illustrated embodiment, the protrusion 270 extends into the pocket 266. As the cap 212 is lowered onto the base 210, the protrusion 270 is received in the corresponding notch 230. The cap 212 may be rotated slightly when the protrusion 270 is at the bottom of the notch 230 to move the protrusion 270 into the locking cavity 232, and thus lock the cap 212 to the base 210. The biasing member 268 forces the protrusion 270 into the locking cavity 232. When the protrusion 270 is in the locking cavity 232, the cap 212 is locked relative to the base 210. In the locked positioned, the cap 212 is unable to rotate relative to the base 210. The angular position of the cap 212 relative to the base 210 is fixed when the cap 212 is locked to the base 210.

To change the angular position of the cap 212 relative to the base 210, the cap 212 is unlocked from the base 210 by compressing the biasing member 268 to remove the protrusion 270 from the locking cavity 232. Rotation of the cap 212 causes the protrusion 270 to move into the vertical segment of the notch 230 where the cap 212 may be lifted upward. Once the protrusion 270 is removed entirely from the notch 230 the cap 212 may be rotated to a different angular position, in which case the protrusion 270 is aligned with a different notch 230. The cap 212 may again be moved downward to load the protrusion 270 into the corresponding notch 230, and the cap 212 may again be locked to the base 210.

Figure 4:
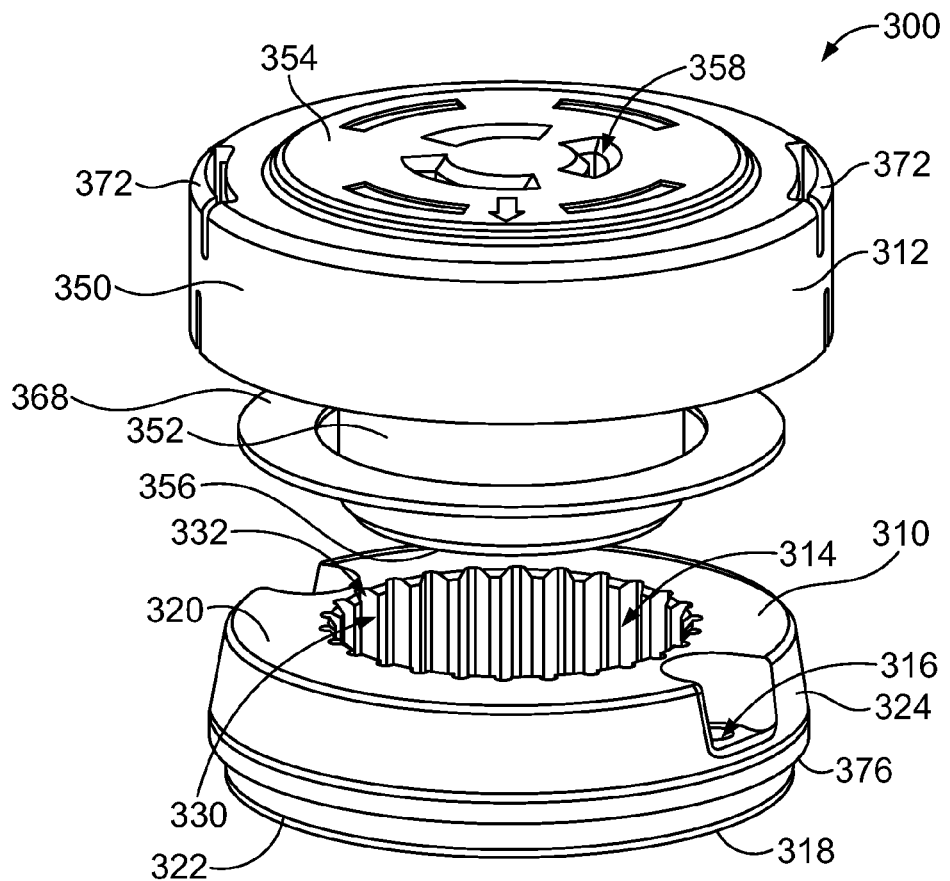
FIG. 4 is an exploded view of a photocell receptacle formed in accordance with an exemplary embodiment.
Figure 5:
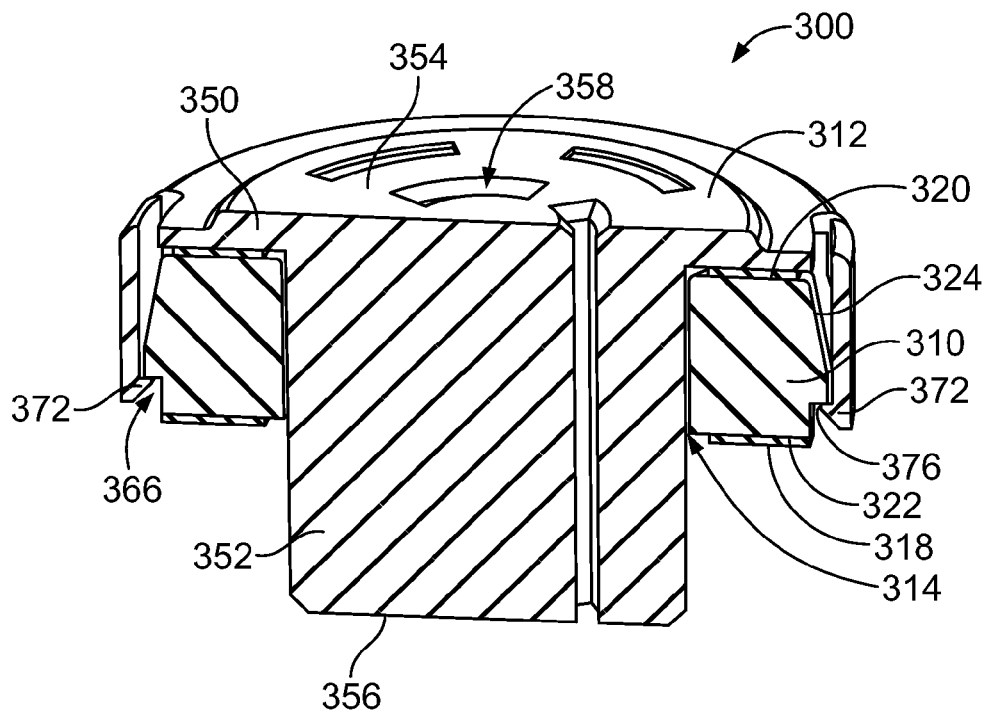
FIG. 5 is a cross sectional view of the photocell receptacle shown in FIG. 4 in an assembled state.
Figure 6:
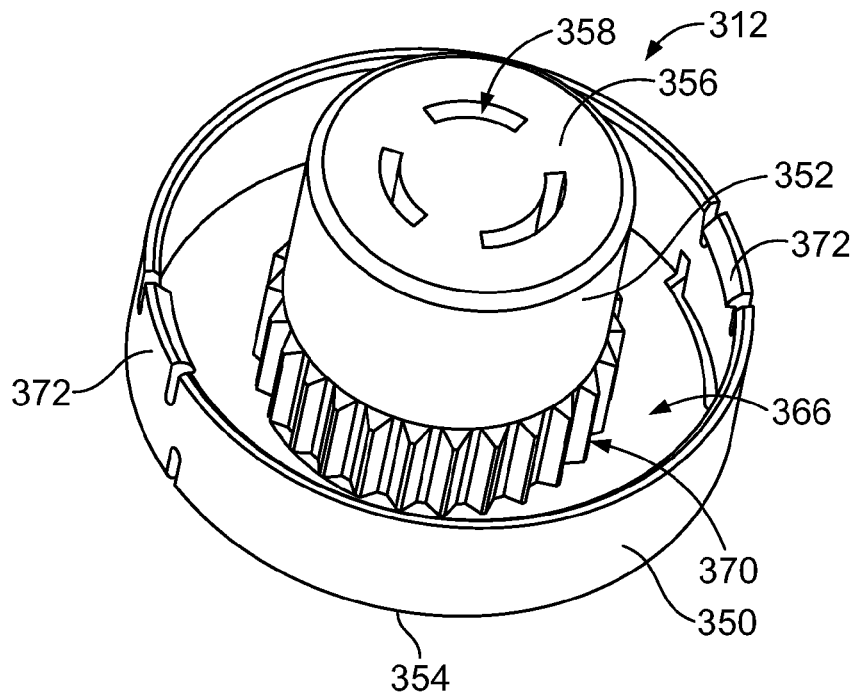
FIG. 6 is a bottom perspective view of a cap of the photocell receptacle shown in FIG. 4.

FIG. 4 is an exploded view of a photocell receptacle 300 formed in accordance with an exemplary embodiment. FIG. 5 is a cross sectional view of the photocell receptacle 300 in an assembled state. FIG. 6 is a bottom perspective view of a cap 312 of the photocell receptacle 300. The photocell receptacle 300 is similar to the photocell receptacles 100 and 200 (shown in FIGS. 1 and 2, respectively) in some aspects. The photocell receptacle 300 receives the photocell 106 (shown in FIG. 1), such as described above with respect to the photocell receptacle 200. The photocell receptacle 300 includes a base 310 and a cap 312 that is configured to be rotatably coupled to the base 310 and positionable at different angular positions relative to the base 310 to control an angular orientation of the photocell 106.

The base 310 includes an opening 314 that provides access to the interior of the housing 102 of the light fixture 104 (both shown in FIG. 1). The base 310 includes fastener openings 316 passing therethrough that are configured to receive fasteners (not shown) used to secure the base 310 to the housing 102 of the light fixture 104. The base 310 may be secured to the housing 102 by other mounting features in alternative embodiments. In an exemplary embodiment, a seal 318 may be provided between the base 310 and the housing 102 to seal the light fixture 104 from environmental containments such as water, debris, and the like.

The base 310 includes a top 320 and a bottom 322 opposite the top 320. The bottom 322 is configured to be secured to the housing 102. The base 310 includes a side wall 324 between the top 320 and the bottom 322. In an exemplary embodiment, the base 310 is circular to allow easy rotation of the cap 312 relative to the base 310. However, the base 310 may have other shapes and alternative embodiments.

The base 310 includes at least one base locking feature 330 used to lock the cap 312 relative to the base 310. In an exemplary embodiment, the base 310 includes a plurality of base locking features 330 at different angular positions about the base 310 to allow for positioning of the cap 312 at different angular positions relative to the base 310. In the illustrated embodiment, the base locking features 330 are teeth, and may be referred to hereinafter as teeth 330. The teeth 330 are positioned around the opening 314. The teeth 330 have spaces 332 between the teeth 330. Any number of teeth 330 may be provided, wherein having more teeth 330 allows for more angular positions of the cap 312 relative to the base 310.

The cap 312 has a head 350 and a neck 352 extending from the head 350. The head 350 is provided at a top 354 of the cap 312. The neck 352 is provided at a bottom 356 of the cap 312. The neck 352 is configured to be received in the opening 314 of the base 310. The head 350 has a larger diameter than the neck 352. In an exemplary embodiment, the head 350 and neck 352 are circular to allow easy rotation of the cap 312 relative to the base 310. However, other shapes are possible in alternative embodiment. The cap 312 has a plurality of contact channels 358 extending through the head 350 and/or the neck 352. The head 350 includes a pocket 366 open at the bottom of the head 350. When the cap 312 is coupled to the base 310, the base 310 is received in the pocket 366.

Optionally, a gasket 368 may be received in the pocket 366 and positioned between the cap 312 and the base 310. The gasket 368 may provide sealing between the base 310 and the cap 312. In an exemplary embodiment, the gasket 368 is compressible and may provide compliance between the base 310 and the cap 312. As such, the gasket 368 may define a biasing member, and may be referred to hereinafter as biasing member 368. The biasing member 368 may be biased against the cap 312 to force the cap 312 upward relative to the base 310.

In an exemplary embodiment, the cap 312 includes one or more cap locking features 370 (FIG. 6). The cap locking features 370 are configured to engage corresponding base locking features 330 to lock the cap 312 to the base 310. The cap locking feature 370 may be a protrusion receivable in the base locking features 330, and may be referred to hereinafter as protrusion 370. In the illustrated embodiment, the cap locking features 370 are teeth, and may be referred to herein after as teeth 370. In the illustrated embodiment, the teeth 370 are provided around the neck 352 and extend into the pocket 366. As the cap 312 is lowered onto the base 310, the teeth 370 internest with the teeth 330 to lock the cap 312 relative to the base 310. In the locked positioned, the cap 312 is unable to rotate relative to the base 310. The angular position of the cap 312 relative to the base 310 is fixed when the cap 312 is locked to the base 310.

To change the angular position of the cap 312 relative to the base 310, the cap 312 is lifted upward to un-nest the teeth 370 from the teeth 330. Once the teeth 370 are un-nested, the cap 312 may be rotated to a different angular position, in which case the teeth 370 are aligned with different spaces 332. The cap 312 may again be moved downward to load the teeth 370 into the corresponding spaces 332, and the cap 312 may again be locked to the base 310.

In an exemplary embodiment, the cap 312 includes latches 372 that are used to latchably couple the cap 312 to the base 310. The latches 372 are deflectable. Any number of latches may be provided. The latches 372 are provided on the head 350. The latches 372 may be deflected by pressing inward on the top of the latches 372. The base 310 includes a circumferential shoulder 376 at or near the bottom 322. The latches 372 are captured below the shoulder 376 to hold the cap 312 on the base 310. The latches axially secure the cap 312 relative to the base 310.

Figure 7:
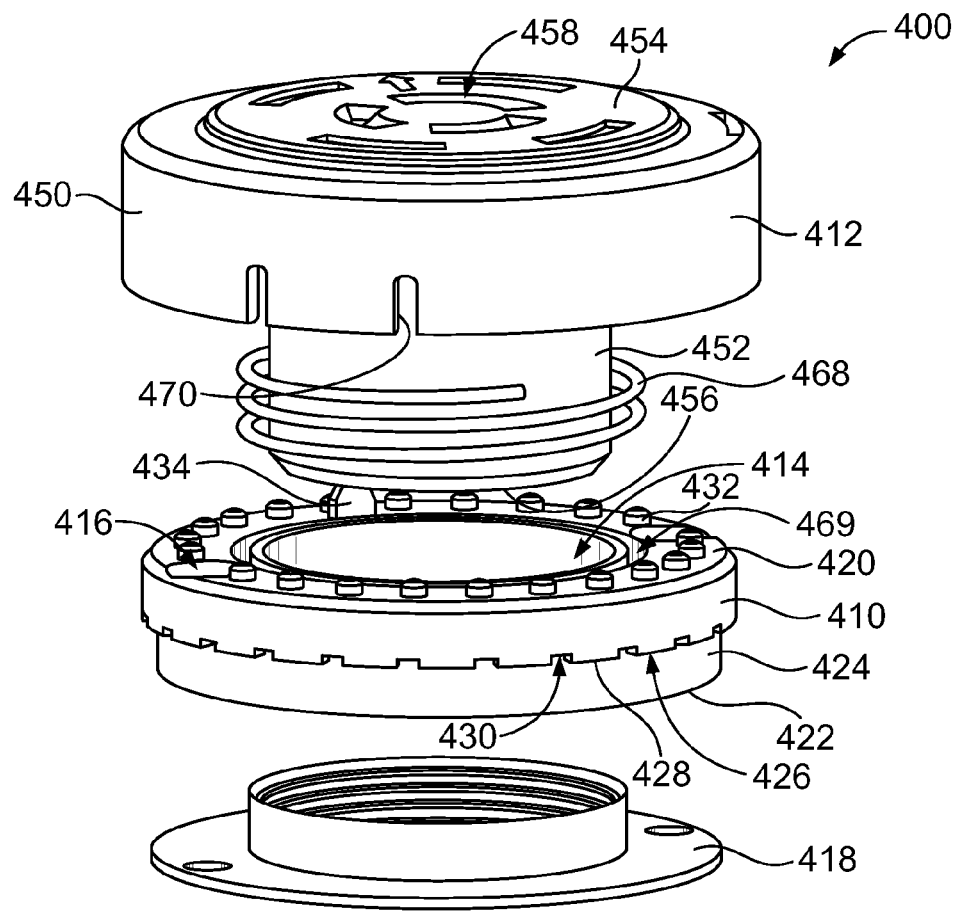
FIG. 7 is an exploded view of a photocell receptacle formed in accordance with an exemplary embodiment.
Figure 8:
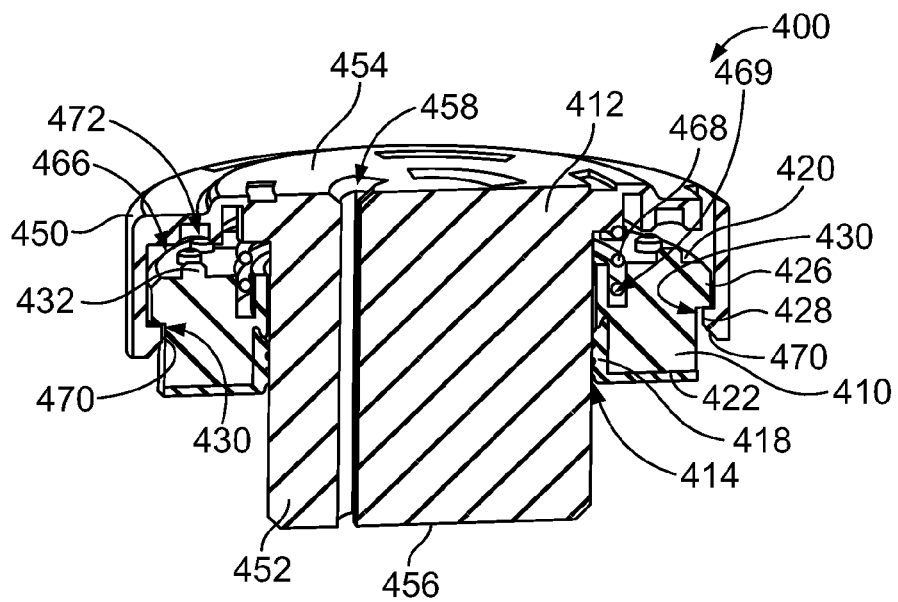
FIG. 8 is a cross sectional view of the photocell receptacle shown in FIG. 7 in a locked position.
Figure 9:
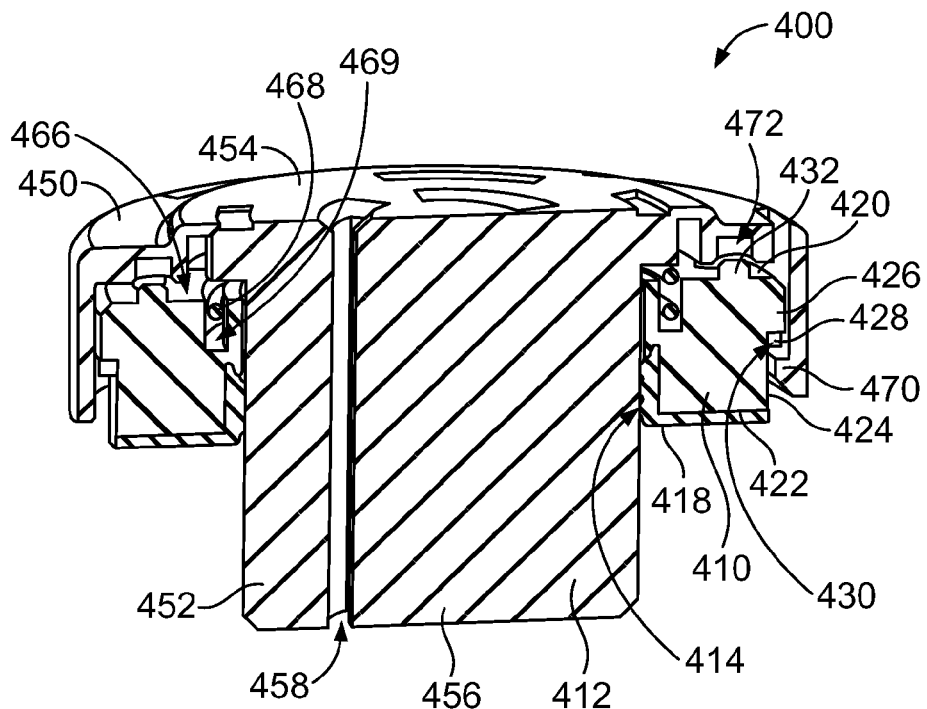
FIG. 9 is a cross sectional view of the photocell receptacle shown in FIG. 7 in an unlocked position.
Figure 10:
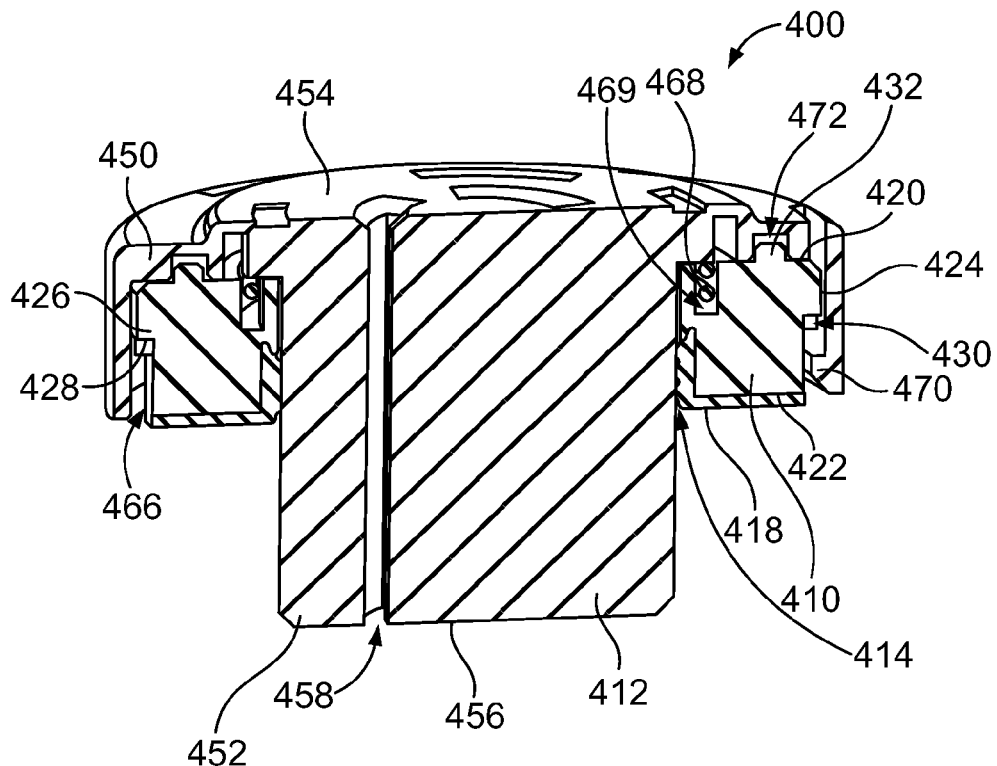
FIG. 10 is a cross sectional view of the photocell receptacle shown in FIG. 7 in a photocell mating position.

FIG. 7 is an exploded view of a photocell receptacle 400 formed in accordance with an exemplary embodiment. FIG. 8 is a cross sectional view of the photocell receptacle 400 in a locked position. FIG. 9 is a cross sectional view of the photocell receptacle 400 in an unlocked position. FIG. 10 is a cross sectional view of the photocell receptacle 400 in a photocell mating position.

The photocell receptacle 400 is similar to the photocell receptacles 100, 200, 300 in some aspects. The photocell receptacle 400 receives the photocell 106 (shown in FIG. 1), such as described above with respect to the photocell receptacle 200. The photocell receptacle 400 includes a base 410 and a cap 412 that is configured to be rotatably coupled to the base 410 and positionable at different angular positions relative to the base 410 to control an angular orientation of the photocell 106.

The base 410 includes an opening 414 that provides access to the interior of the housing 102 of the light fixture 104 (both shown in FIG. 1). The base 410 includes fastener openings 416 passing therethrough that are configured to receive fasteners (not shown) used to secure the base 410 to the housing 102 of the light fixture 104. The base 410 may be secured to the housing 102 by other mounting features in alternative embodiments. In an exemplary embodiment, a seal 418 may be provided between the base 410 and the housing 102 to seal the light fixture 104 from environmental containments such as water, debris, and the like. In an exemplary embodiment, the seal 418 may also be positioned between the base 410 and the cap 412 to provide sealing therebetween.

The base 410 includes a top 420 and a bottom 422 opposite the top 420. The bottom 422 is configured to be secured to the housing 102. The base 410 includes a side wall 424 between the top 420 and the bottom 422. The side wall 424 includes a ledge 426 having a downward facing surface 428. Optionally, the ledge 426 may be approximately centered between the top 420 and the bottom 422. In an exemplary embodiment, the base 410 is circular to allow easy rotation of the cap 412 relative to the base 410. However, the base 410 may have other shapes and alternative embodiments.

The base 410 includes at least one base locking feature 430 used to lock the cap 412 relative to the base 410. In an exemplary embodiment, the base 410 includes a plurality of base locking features 430 at different angular positions about the base 410 to allow for positioning of the cap 412 at different angular positions relative to the base 410. In the illustrated embodiment, the base locking features 430 are notches formed in the ledge 426, and may be referred to hereinafter as notches 430. Any number of notches 430 may be provided, wherein having more notches 430 allows for more angular positions of the cap 412 relative to the base 410.

The base 410 includes at least one anti-rotation post 432 at the top 420. When the cap 412 engages the anti-rotation posts 432, the cap 412 is restricted from rotating. The cap 412 may engage the anti-rotation posts 432 during mating of the photocell 106 to the cap 412 to allow rotation of the photocell 106 to a mated position without rotation of the cap 412. In alternative embodiments, the anti-rotation posts 432 may be provided on the cap 412 rather than the base 410.

In an exemplary embodiment, the base 410 includes an over-rotation feature 434 at the top 420. The over-rotation feature 434 may be a post or protrusion extending from the top 420. The over-rotation feature 434 restricts over rotation of the cap 412 relative to the base 410. For example, the over-rotation feature 434 may restrict rotation to less than 360°. Limiting rotation reduces the risk of over-twisting of the wires as the cap 412 is rotated, which could cause the wires to separate from the electrical contacts or from the light fixture 104. The cap 412 may include an opening that receives the over-rotation feature 434 to stop rotation. The cap 412 may include a stopper or shoulder that abuts against the over-rotation feature 434 to stop rotation. In alternative embodiments, the over-rotation feature 434 may be provided on the cap 412 rather than the base 410.

The cap 412 has a head 450 and a neck 452 extending from the head 450. The head 450 is provided at a top 454 of the cap 412. The neck 452 is provided at a bottom 456 of the cap 412. The neck 452 is configured to be received in the opening 414 of the base 410. The head 450 has a larger diameter than the neck 452. In an exemplary embodiment, the head 450 and neck 452 are circular to allow easy rotation of the cap 412 relative to the base 410. However, other shapes are possible in alternative embodiment. The cap 412 has a plurality of contact channels 458 extending through the head 450 and/or the neck 452. The head 450 includes a pocket 466 open at the bottom of the head 450. When the cap 412 is coupled to the base 410, the base 410 is received in the pocket 466.

Optionally, a biasing member 468 may be received in the pocket 466 and positioned between the cap 412 and the base 410. The biasing member 468 may be a coil spring in some embodiments. The biasing member 468 is compressible and causes the cap 412 to be biased away from the base 410, such as to a locked position. The biasing member 468 may be biased against the cap 412 to force the cap 412 upward relative to the base 410. The biasing member 468 may be received in a circumferential groove 469 in the base 410 to position the biasing member 468 relative to the base 410.

In an exemplary embodiment, the cap 412 includes one or more cap locking features 470 (FIG. 8). The cap locking features 470 are configured to engage corresponding base locking features 430 to lock the cap 412 to the base 410. In the illustrated embodiment, the cap locking features 470 are protrusions, and may be referred to herein after as protrusions 470. In the illustrated embodiment, the protrusions 470 are provided at various locations about the neck 452 and extend into the pocket 466. When the cap 412 is coupled to the base 410, the protrusions 470 are received in corresponding notches 430 to lock the cap 412 relative to the base 410. In the locked positioned (FIG. 8), the cap 412 is unable to rotate relative to the base 410. The angular position of the cap 412 relative to the base 410 is fixed when the cap 412 is locked to the base 410. The biasing member 468 forces the protrusions 470 into the notches 430. The spring bias of the biasing member 468 may be overcome by pushing downward of the cap 412 to move the cap to the unlocked position (FIG. 9).

To change the angular position of the cap 412 relative to the base 410, the cap 412 is pressed downward to the unlocked position. Once the protrusions 470 are un-nested from the notches 430, the cap 412 may be rotated to a different angular position, in which case the protrusions 470 are aligned with different notches 430. The cap 412 may then be released and the biasing member 468 forces the cap 412 to the locked position (FIG. 8).

During mating of the photocell 106 to the cap 412, the photocell is pressed downward into the cap 412. The downward pressure forces the cap 412 downward to the photocell mating position (FIG. 10). In the photocell mating position, the anti-rotation posts 432 are received in corresponding anti-rotation pockets 472 in the cap 412. When the anti-rotation posts 432 are received in the anti-rotation pockets 472, rotation of the cap 412 relative to the base 410 is restricted. In such position, the photocell 106 is able to be rotated to a locked position in the cap 412. When the photocell 106 is released, the biasing member 468 forces the cap 412 to return to the locked position (FIG. 8).

Figure 11:
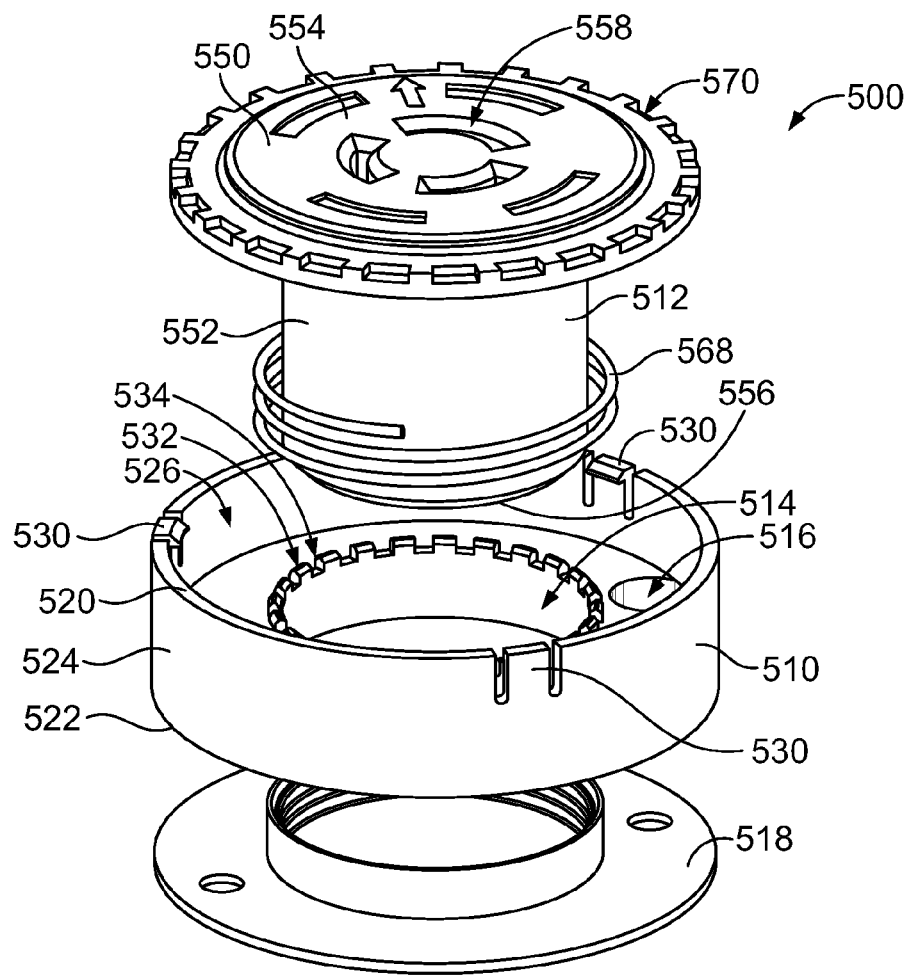
FIG. 11 is an exploded view of a photocell receptacle formed in accordance with an exemplary embodiment.
Figure 12:
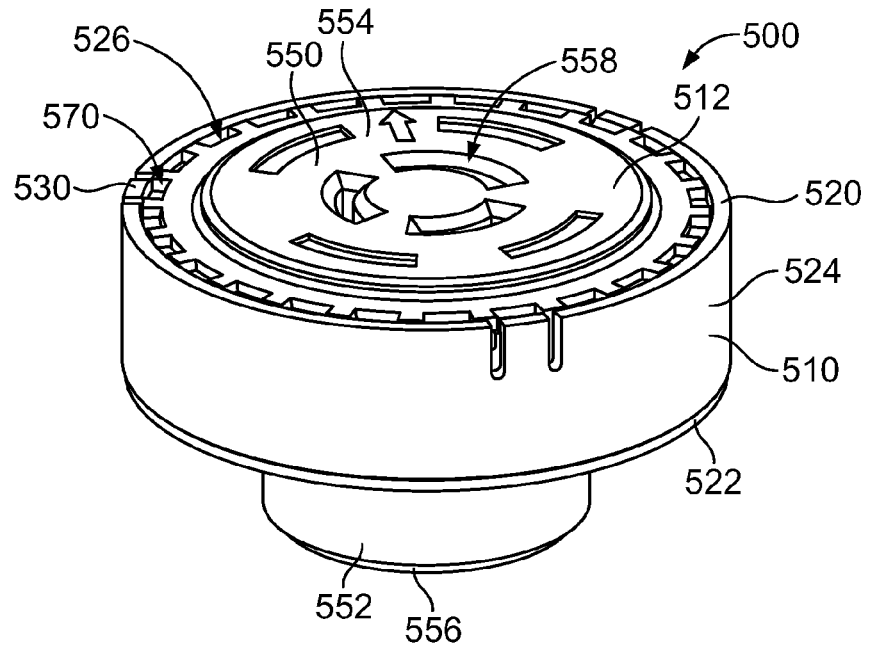
FIG. 12 is an assembled view of the photocell receptacle shown in FIG. 11.
Figure 13:
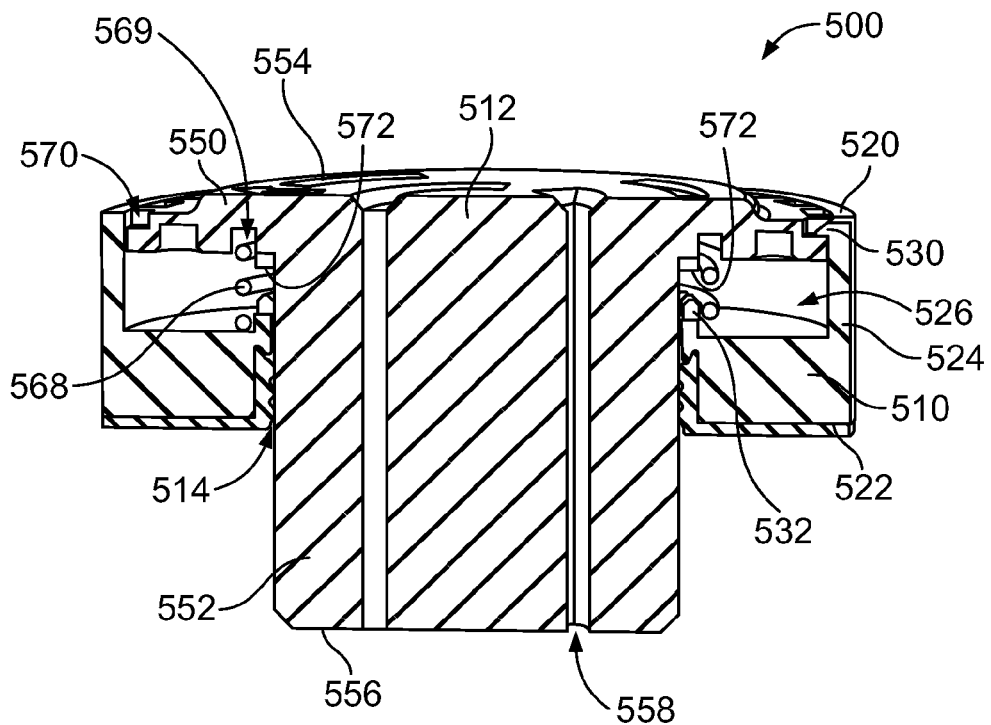
FIG. 13 is a cross sectional view of the photocell receptacle shown in FIG. 11 in a locked position.
Figure 14:
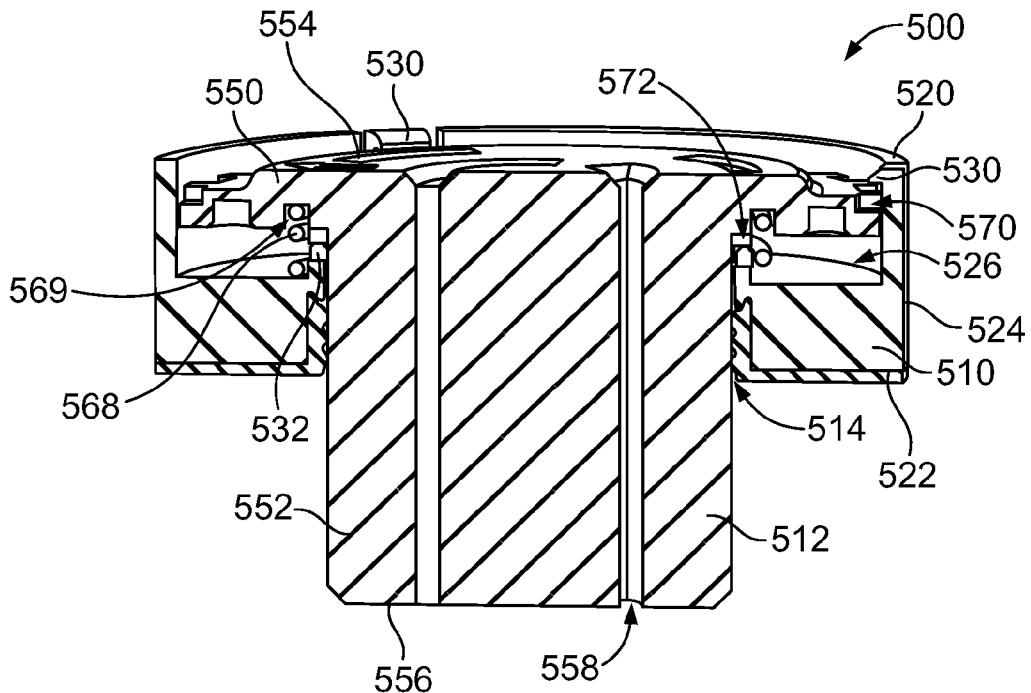
FIG. 14 is a cross sectional view of the photocell receptacle shown in FIG. 11 in an unlocked position.

FIG. 11 is an exploded view of a photocell receptacle 500 formed in accordance with an exemplary embodiment. FIG. 12 is an assembled view of the photocell receptacle 500. FIG. 13 is a cross sectional view of the photocell receptacle 500 in a locked position. FIG. 14 is a cross sectional view of the photocell receptacle 500 in an unlocked position.

The photocell receptacle 500 is similar to the photocell receptacles 100, 200, 300, 400 in some aspects. The photocell receptacle 500 receives the photocell 106 (shown in FIG. 1), such as described above with respect to the photocell receptacle 200. The photocell receptacle 500 includes a base 510 and a cap 512 that is configured to be rotatably coupled to the base 510 and positionable at different angular positions relative to the base 510 to control an angular orientation of the photocell 106.

The base 510 includes an opening 514 that provides access to the interior of the housing 102 of the light fixture 104 (both shown in FIG. 1). The base 510 includes fastener openings 516 passing therethrough that are configured to receive fasteners (not shown) used to secure the base 510 to the housing 102 of the light fixture 104. The base 510 may be secured to the housing 102 by other mounting features in alternative embodiments. In an exemplary embodiment, a seal 518 may be provided between the base 510 and the housing 102 to seal the light fixture 104 from environmental containments such as water, debris, and the like. In an exemplary embodiment, the seal 518 may also be positioned between the base 510 and the cap 512 to provide sealing therebetween.

The base 510 includes a top 520 and a bottom 522 opposite the top 520. The bottom 522 is configured to be secured to the housing 102. The base 510 includes a side wall 524 between the top 520 and the bottom 522. The base 510 includes a cavity 526 at the top 520 that receives the cap 512. In an exemplary embodiment, the base 510 is circular to allow easy rotation of the cap 512 relative to the base 510. However, the base 510 may have other shapes and alternative embodiments.

The base 510 includes at least one base locking feature 530 used to lock the cap 512 relative to the base 510. In an exemplary embodiment, the base 510 includes a plurality of base locking features 530 at different angular positions about the base 510 to allow for positioning of the cap 512 at different angular positions relative to the base 510. In the illustrated embodiment, the base locking features 530 are latches formed in the side wall 524, and may be referred to hereinafter as latches 530. The latches 530 are deflectable. Any number of latches 530 may be provided.

The base 510 includes at least one anti-rotation post 532 exposed through the top 520 and surrounding the opening 514. The anti-rotation posts 532 are recessed below the top 520. The anti-rotation posts 532 are provided in the cavity 526. The anti-rotation posts 532 have spaces 534 therebetween. When the cap 512 engages the anti-rotation posts 532, the cap 512 is restricted from rotating. The cap 512 may engage the anti-rotation posts 532 during mating of the photocell 106 to the cap 512 to allow rotation of the photocell 106 to a mated position without rotation of the cap 512. In alternative embodiments, the anti-rotation posts 532 may be provided on the cap 512 rather than the base 510. The base 510 may include an over-rotation feature (not shown).

The cap 512 has a head 550 and a neck 552 extending from the head 550. The head 550 is provided at a top 554 of the cap 512. The neck 552 is provided at a bottom 556 of the cap 512. The neck 552 is configured to be received in the opening 514 of the base 510. The head 550 has a larger diameter than the neck 552. In an exemplary embodiment, the head 550 and neck 552 are circular to allow easy rotation of the cap 512 relative to the base 510. However, other shapes are possible in alternative embodiment. The cap 512 has a plurality of contact channels 558 extending through the head 550 and/or the neck 552.

Optionally, a biasing member 568 may be received in the cavity 526 and positioned between the cap 512 and the base 510. The biasing member 568 may be a coil spring in some embodiments. The biasing member 568 is compressible and causes the cap 512 to be biased away from the base 510, such as to a locked position (FIG. 13). The biasing member 568 may be biased against the cap 512 to force the cap 512 upward relative to the base 510. The biasing member 568 may be positioned around the anti-rotation posts 532. Optionally, the biasing member 568 may be received in a circumferential groove 569 in the cap 512 to position the biasing member 568 relative to the cap 512.

In an exemplary embodiment, the cap 512 includes one or more cap locking features 570. The cap locking features 570 are configured to engage corresponding base locking features 530 to lock the cap 512 to the base 510. In the illustrated embodiment, the cap locking features 570 are notches, and may be referred to herein after as notches 570. In the illustrated embodiment, the notches 570 are provided at various locations about the head 550. Any number of notches 570 may be provided, wherein having more notches 570 allows for more angular positions of the cap 512 relative to the base 510. When the cap 512 is coupled to the base 510, the notches 570 receive the latches 530 to lock the cap 512 relative to the base 510. In the locked positioned (FIG. 8), the cap 512 is unable to rotate relative to the base 510. The angular position of the cap 512 relative to the base 510 is fixed when the cap 512 is locked to the base 510. The biasing member 568 forces the cap 512 into the locked position with the latches 530 in the notches 570. The spring bias of the biasing member 568 may be overcome by pushing downward of the cap 512 to move the cap to the unlocked position (FIG. 14).

To change the angular position of the cap 512 relative to the base 510, the cap 512 is pressed downward to the unlocked position. Once the notches 570 release the latches 530, the cap 512 may be rotated to a different angular position, in which case the latches 530 are aligned with different notches 570. The cap 512 may then be released and the biasing member 568 forces the cap 512 to the locked position (FIG. 13).

During mating of the photocell 106 to the cap 512, the photocell is pressed downward into the cap 512. The downward pressure forces the cap 512 downward to a photocell mating position (not shown). In the photocell mating position, the anti-rotation posts 532 are received in corresponding anti-rotation pockets 572 in the cap 512. When the anti-rotation posts 532 are received in the anti-rotation pockets 572, rotation of the cap 512 relative to the base 510 is restricted. In such position, the photocell 106 is able to be rotated to a locked position in the cap 512. When the photocell 106 is released, the biasing member 568 forces the cap 512 to return to the locked position (FIG. 13).

Figure 15:
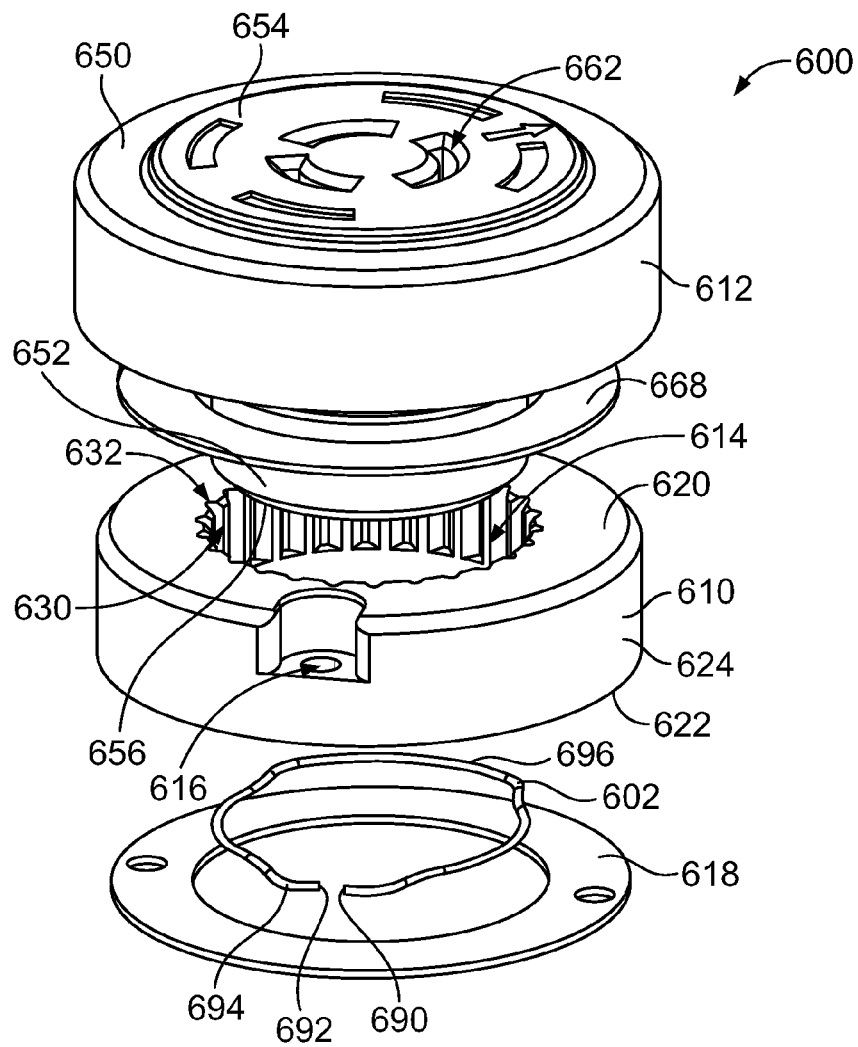
FIG. 15 is an exploded view of a photocell receptacle formed in accordance with an exemplary embodiment.
Figure 16:
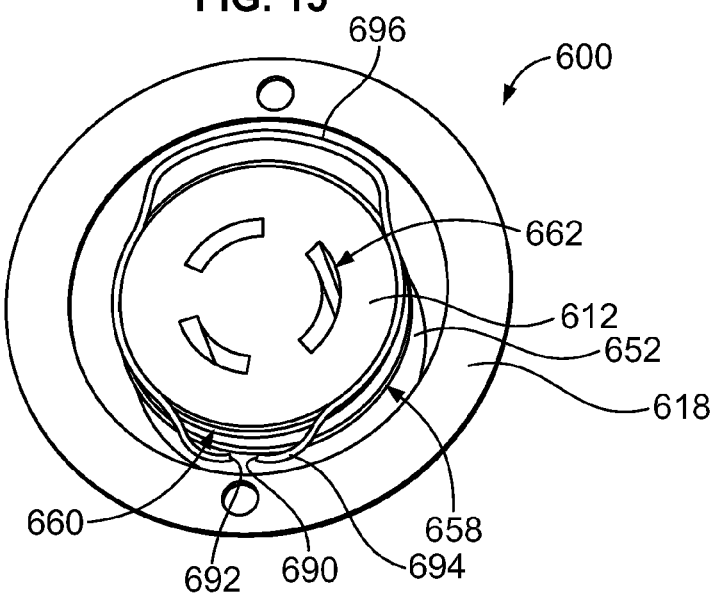
FIG. 16 is a cross sectional view of the photocell receptacle shown in FIG. 15.
Figure 17:
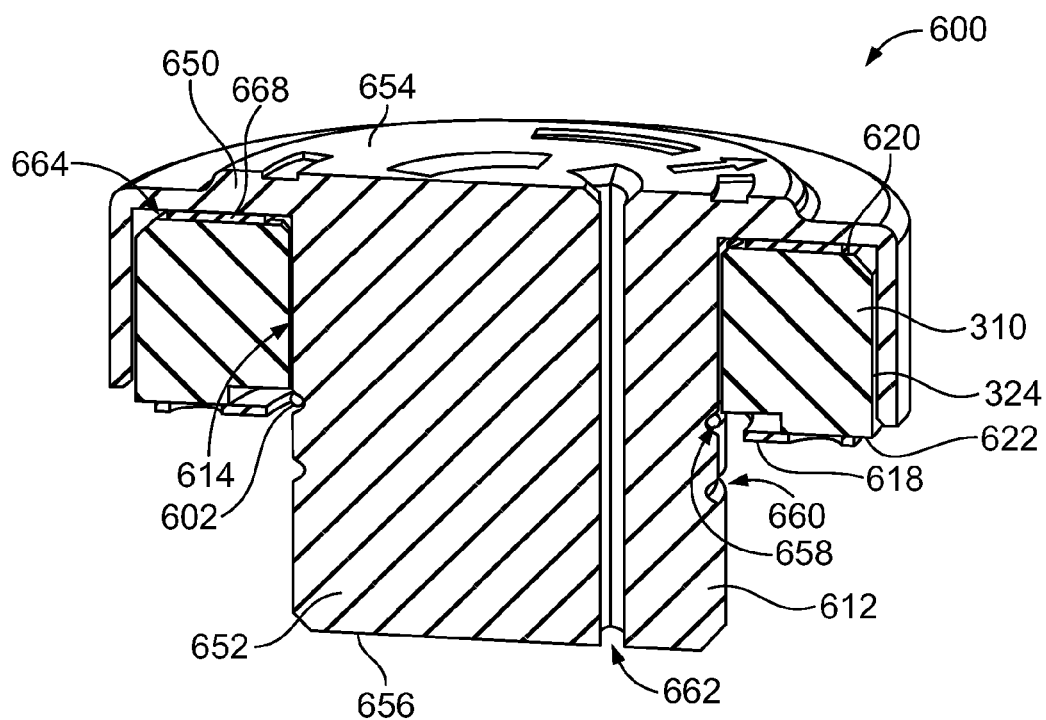
FIG. 17 is a cross-sectional view of the photocell receptacle shown in FIG. 15 in a locked position.
Figure 18:
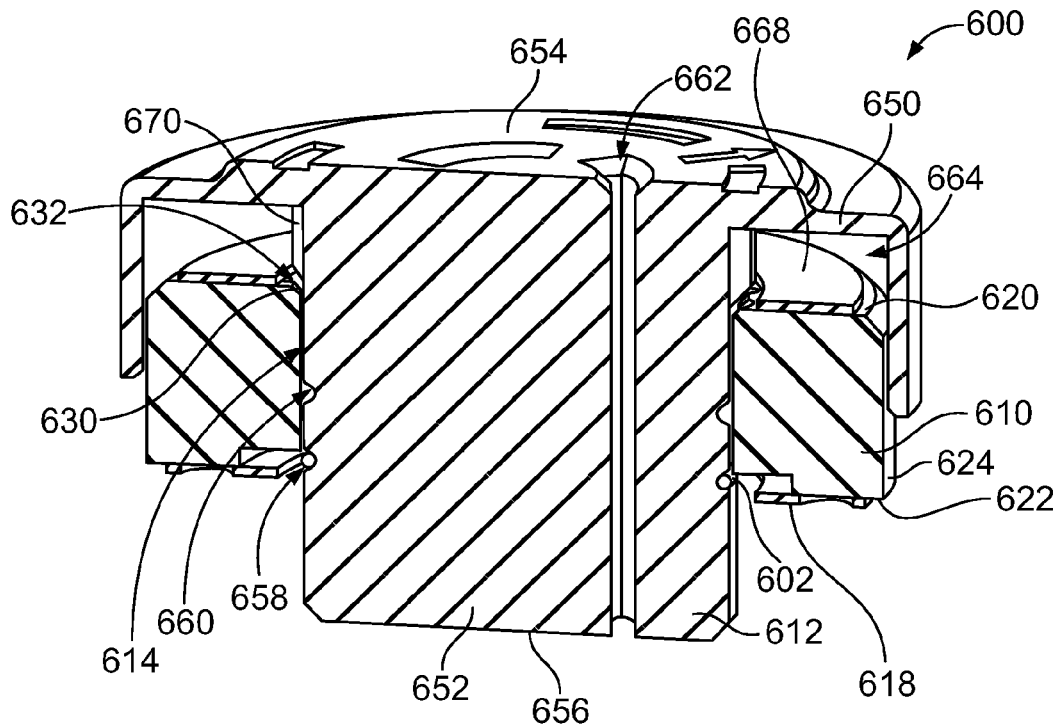
FIG. 18 is a cross-sectional view of the photocell receptacle shown in FIG. 15 in an unlocked position.

FIG. 15 is an exploded view of a photocell receptacle 600 formed in accordance with an exemplary embodiment. FIG. 16 is a cross sectional view of the photocell receptacle 600. FIG. 17 is a cross-sectional view of the photocell receptacle in a locked position. FIG. 18 is a cross-sectional view of the photocell receptacle in an unlocked position.

The photocell receptacle 600 is similar to the photocell receptacles 100, 200, 300, 400, 500 in some aspects, however the photocell receptacle 600 includes a retention clip 602 used to retain the photocell receptacle 600 in the locked position and in the unlocked position. The photocell receptacle 600 receives the photocell 106 (shown in FIG. 1), such as described above with respect to the photocell receptacle 200. The photocell receptacle 600 includes a base 610 and a cap 612 that is configured to be rotatably coupled to the base 610 and positionable at different angular positions relative to the base 610 to control an angular orientation of the photocell 106. The retention clip 602 holds the axial position of the cap 612 relative to the base 610. In an exemplary embodiment, the retention clip 602 is configured to hold the cap 612 in at least two different axial positions, such as a locked position and an unlocked position, relative to the base 610.

The base 610 includes an opening 614 that provides access to the interior of the housing 102 of the light fixture 104 (both shown in FIG. 1). The base 610 includes fastener openings 616 passing therethrough that are configured to receive fasteners (not shown) used to secure the base 610 to the housing 102 of the light fixture 104. The base 610 may be secured to the housing 102 by other mounting features in alternative embodiments. In an exemplary embodiment, a seal 618 may be provided between the base 610 and the housing 102 to seal the light fixture 104 from environmental containments such as water, debris, and the like.

The base 610 includes a top 620 and a bottom 622 opposite the top 620. The bottom 622 is configured to be secured to the housing 102. In an exemplary embodiment, the retention clip 602 is positioned between the bottom 622 and the housing 102. The base 610 includes a side wall 624 between the top 620 and the bottom 622. In an exemplary embodiment, the base 610 is circular to allow easy rotation of the cap 612 relative to the base 610. However, the base 610 may have other shapes and alternative embodiments.

The base 610 includes at least one base locking feature 630 used to lock the cap 612 relative to the base 610. In an exemplary embodiment, the base 610 includes a plurality of base locking features 630 at different angular positions about the base 610 to allow for positioning of the cap 612 at different angular positions relative to the base 610. In the illustrated embodiment, the base locking features 630 are teeth, and may be referred to hereinafter as teeth 630. The teeth 630 are positioned around the opening 614. The teeth 630 have spaces 632 between the teeth 630. Any number of teeth 630 may be provided, wherein having more teeth 630 allows for more angular positions of the cap 612 relative to the base 610.

The cap 612 has a head 650 and a neck 652 extending from the head 650. The head 650 is provided at a top 654 of the cap 612. The neck 652 is provided at a bottom 656 of the cap 612. The neck 652 is configured to be received in the opening 614 of the base 610. The head 650 has a larger diameter than the neck 652. In an exemplary embodiment, the head 650 and neck 652 are circular to allow easy rotation of the cap 612 relative to the base 610. However, other shapes are possible in alternative embodiment.

In an exemplary embodiment, the neck 652 includes a first clip groove 658 and a second clip groove 660 vertically offset from the first clip groove 658. The first clip groove 658 is positioned below the second clip groove 660, closer to the bottom 656. The second clip groove 660 is positioned closer to the head 650. The first and second clip grooves 658, 660 are both configured to receive the retention clip 602. For example, in the unlocked position (FIG. 18), the retention clip 602 is positioned in the first clip groove 658, while in the locked position (FIG. 17), the retention clip 602 is positioned in the second clip groove 660. In the unlocked position, the cap 612 is freely rotatable about the base 610, while in the locked position, the cap 612 engages the base locking features 630 such that the cap 612 is unable to rotate relative to the base 610. The cap 612 may be moved from the locked position to the unlocked position by pulling upward on the cap 612 until the retention clip 602 is received in the first clip groove 658. The cap 612 may be moved from the unlocked position to the locked position by pushing downward on the cap 612 until the retention clip 602 is received in the second clip groove 660 (shown in FIG. 16).

The retention clip 602 may be elastically deformed and spread apart to allow the cap 612 to move between the locked and unlocked positions. For example, the retention clip 602 may be split with opposed ends 690, 692 that can be spread apart. The retention clip 602 includes flanged sections 694, 696 that are spaced apart from the cap 612 and configured to be captured between the base 610 and the housing 102.

The cap 612 has a plurality of contact channels 662 extending through the head 650 and/or the neck 652. The head 650 includes a pocket 664 open at the bottom of the head 650. When the cap 612 is coupled to the base 610, the base 610 is received in the pocket 664. Optionally, a gasket 668 may be received in the pocket 664 and positioned between the cap 612 and the base 610. The gasket 668 may provide sealing between the base 610 and the cap 612. The gasket 668 may be compliant.

In an exemplary embodiment, the cap 612 includes one or more cap locking features 670 (FIG. 18). The cap locking features 670 are configured to engage corresponding base locking features 630 to lock the cap 612 to the base 610. The cap locking feature 670 may be a protrusion receivable in the base locking features 630, and may be referred to hereinafter as protrusion 670. In the illustrated embodiment, the cap locking features 670 are teeth, and may be referred to herein after as teeth 670. In the illustrated embodiment, the teeth 670 are provided around the neck 652. As the cap 612 is lowered onto the base 610 to the locked position, the teeth 670 internest with the teeth 630 to lock the cap 612 relative to the base 610. In the locked positioned, the cap 612 is unable to rotate relative to the base 610. The angular position of the cap 612 relative to the base 610 is fixed when the cap 612 is locked to the base 610.

To change the angular position of the cap 612 relative to the base 610, the cap 612 is lifted upward to the unlocked position to un-nest the teeth 670 from the teeth 630. Once the teeth 670 are un-nested, the cap 612 may be rotated about the retention clip 602 to a different angular position, in which case the teeth 670 are aligned with different spaces 632. The cap 612 may again be moved downward to load the teeth 670 into the corresponding spaces 632, and the cap 612 may again be locked to the base 610.

Figure 19:
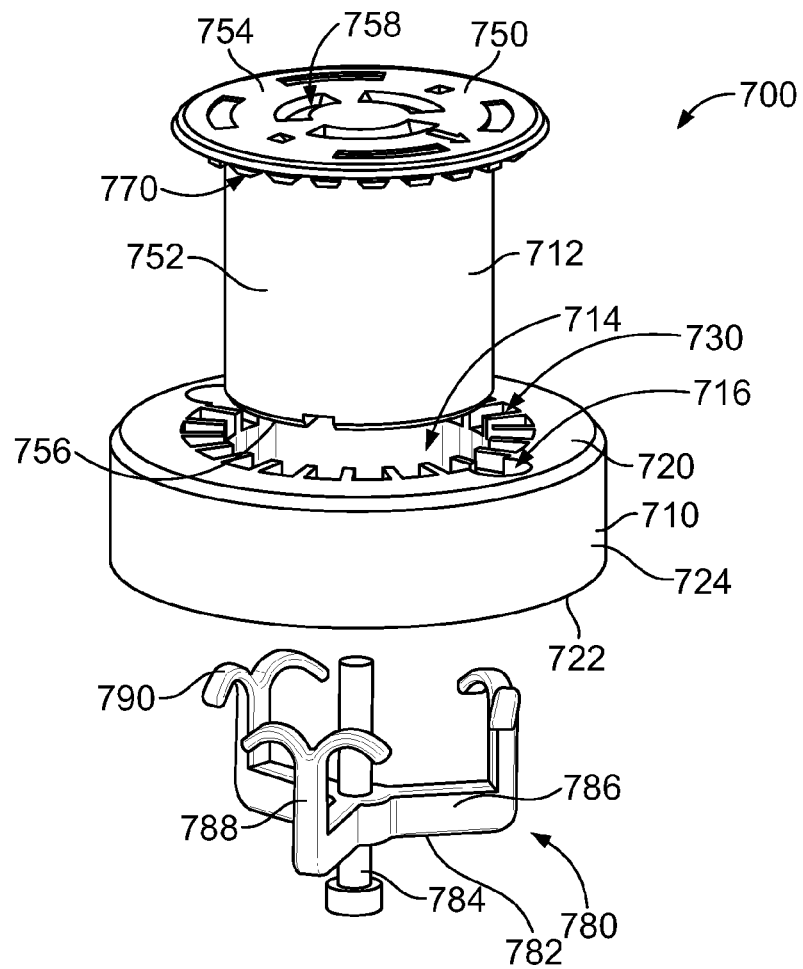
FIG. 19 is an exploded view of a photocell receptacle formed in accordance with an exemplary embodiment.
Figure 20:
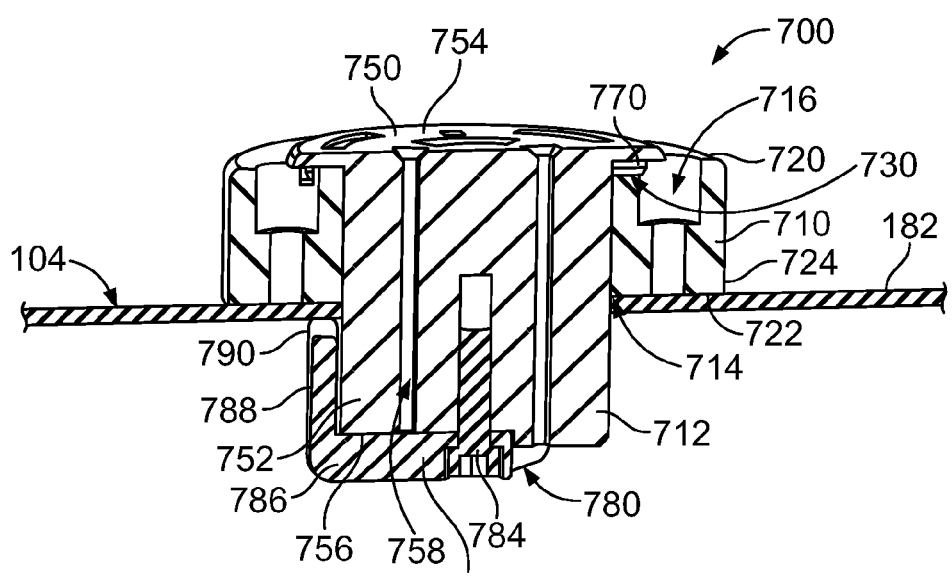
FIG. 20 is an assembled view of the photocell receptacle shown in FIG. 19.

FIG. 19 is an exploded view of a photocell receptacle 700 formed in accordance with an exemplary embodiment. FIG. 20 is a cross sectional view of the photocell receptacle 700 in a locked position.

The photocell receptacle 700 is similar to the photocell receptacles 100, 200, 300, 400, 500, 600 in some aspects. The photocell receptacle 700 receives the photocell 106 (shown in FIG. 1), such as described above with respect to the photocell receptacle 200. The photocell receptacle 700 includes a base 710 and a cap 712 that is configured to be rotatably coupled to the base 710 and positionable at different angular positions relative to the base 710 to control an angular orientation of the photocell 106.

The base 710 includes an opening 714 that provides access to the interior of the housing 102 of the light fixture 104. The base 710 includes fastener openings 716 passing therethrough that are configured to receive fasteners (not shown) used to secure the base 710 to the housing 102 of the light fixture 104. The base 710 may be secured to the housing 102 by other mounting features in alternative embodiments. Optionally, a seal (not shown) may be provided between the base 710 and the housing 102 to seal the light fixture 104 from environmental containments such as water, debris, and the like. The seal may be positioned between the base 710 and the cap 712 to provide sealing therebetween.

The base 710 includes a top 720 and a bottom 722 opposite the top 720. The bottom 722 is configured to be secured to the housing 102. The base 710 includes a side wall 724 between the top 720 and the bottom 722. The base 710 may include a cavity at the top 720 that receives a portion of the cap 712. In an exemplary embodiment, the base 710 is circular to allow easy rotation of the cap 712 relative to the base 710. However, the base 710 may have other shapes and alternative embodiments.

The base 710 includes at least one base locking feature 730 used to lock the cap 712 relative to the base 710. In an exemplary embodiment, the base 710 includes a plurality of base locking features 730 at different angular positions about the base 710 to allow for positioning of the cap 712 at different angular positions relative to the base 710. In the illustrated embodiment, the base locking features 730 are notches formed in the top 720 around the opening 714 and/or in the cavity, and may be referred to hereinafter as notches 730. Any number of notches 730 may be provided.

The cap 712 has a head 750 and a neck 752 extending from the head 750. The head 750 is provided at a top 754 of the cap 712. The neck 752 is provided at a bottom 756 of the cap 712. The neck 752 is configured to be received in the opening 714 of the base 710. The head 750 has a larger diameter than the neck 752. In an exemplary embodiment, the head 750 and neck 752 are circular to allow easy rotation of the cap 712 relative to the base 710. However, other shapes are possible in alternative embodiment. The cap 712 has a plurality of contact channels 758 extending through the head 750 and/or the neck 752.

In an exemplary embodiment, a biasing member 780 is coupled to the cap 712. The biasing member 780 is positioned in the housing 102 and is configured to be biased against an interior surface of the housing 102 to pull the cap 712 downward into the base 710. The biasing member 780 holds the cap 712 in a locked position. Optionally, the biasing member 780 is a molded plastic part; however other types of biasing members 780 may be used in alternative embodiments, such as a stamped steel spring. The biasing member 780 includes a base 782 that is attached to the cap 712 by a fastener 784 or other methods of attaching, such as clips, snaps, posts, and the like. The base 782 includes several spokes 786 extending radially outward. The biasing member 780 includes arms 788 at the ends of the spokes 786. Deflectable spring fingers 790 are provided at the ends of the arms 788. The spring fingers 790 engage the housing 102. When the cap 712 is pulled upward to an unlocked position, the spring fingers 790 are deflected and elastically deformed. In the unlocked position, the cap 712 may be rotated to a different angular position and then released back to a locked position. The spring fingers 790 pull the cap 712 downward to the locked position. Other types of biasing members may be provided in alternative embodiments.

In an exemplary embodiment, the cap 712 includes one or more cap locking features 770. The cap locking features 770 are configured to engage corresponding base locking features 730 to lock the cap 712 to the base 710. In the illustrated embodiment, the cap locking features 770 are protrusions, and may be referred to herein after as protrusions 770. The protrusions 770 may define teeth. In the illustrated embodiment, the protrusions 770 are provided at various locations about the head 750. Any number of protrusions 770 may be provided. When the cap 712 is coupled to the base 710, the protrusions 770 are received in the notches 730 to lock the cap 712 relative to the base 710. In the locked positioned, the cap 712 is unable to rotate relative to the base 710. The angular position of the cap 712 relative to the base 710 is fixed when the cap 712 is locked to the base 710. The biasing member 780 forces the cap 712 into the locked position with the protrusions 770 in the notches 730. The spring bias of the biasing member 780 may be overcome by pulling upward on the cap 712 to move the cap to the unlocked position.

Figure 21:
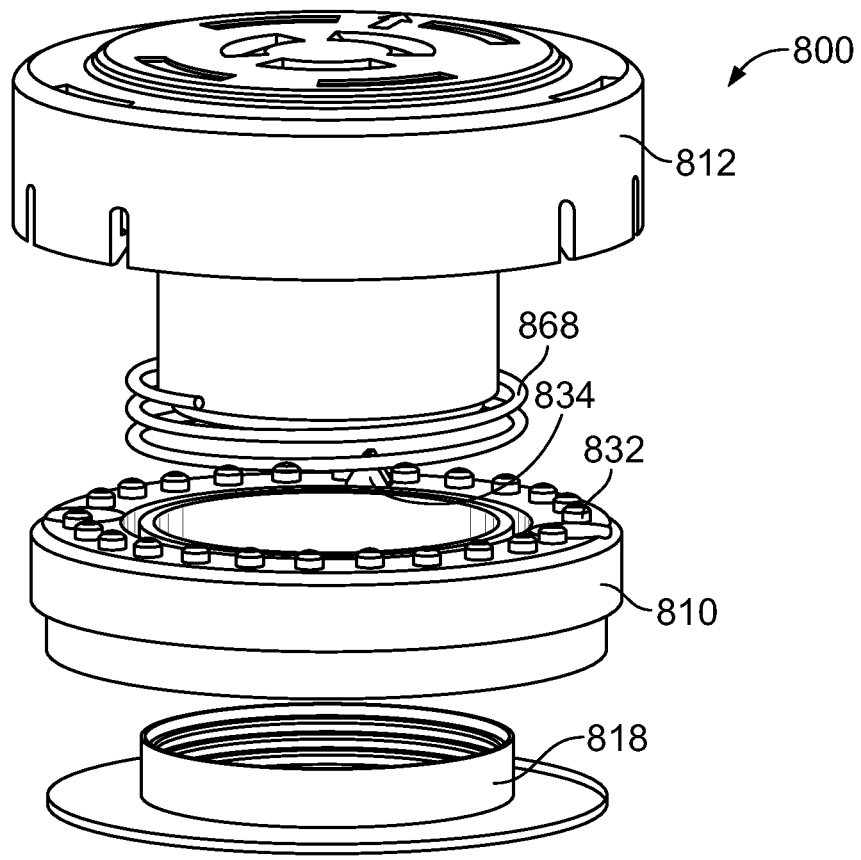
FIG. 21 is an exploded view of a photocell receptacle formed in accordance with an exemplary embodiment.
Figure 22:
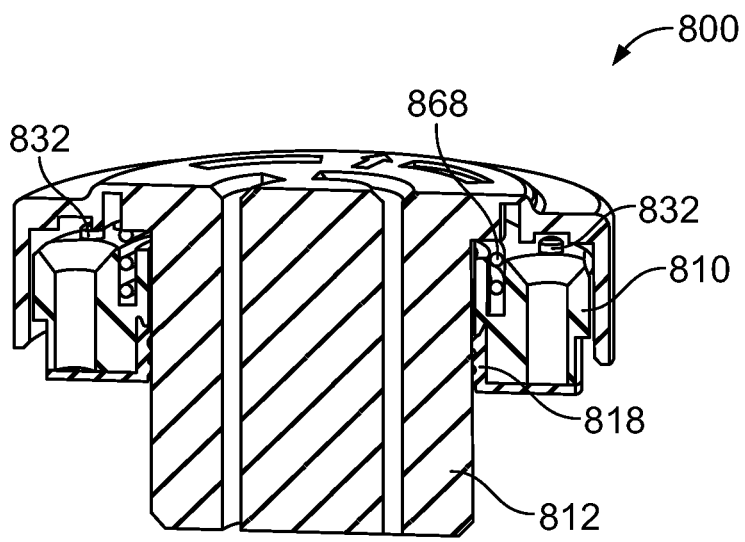
FIG. 22 is a cross sectional view of the photocell receptacle shown in FIG. 21.

FIG. 21 is an exploded view of a photocell receptacle 800 formed in accordance with an exemplary embodiment. FIG. 22 is a cross sectional view of the photocell receptacle 800. The photocell receptacle 800 is similar to the photocell receptacles 100, 200, 300, 400, 500, 600, 700 in some aspects. The photocell receptacle 800 receives the photocell 106 (shown in FIG. 1), such as described above with respect to the photocell receptacle 200. The photocell receptacle 800 includes a base 810 and a cap 812 that is configured to be rotatably coupled to the base 810 and positionable at different angular positions relative to the base 810 to control an angular orientation of the photocell 106.

In an exemplary embodiment, a seal 818 may be provided between the base 810 and the housing 102 and between the base 810 and the cap 812 to provide sealing therebetween to seal the light fixture 104 from environmental containments such as water, debris, and the like. In an exemplary embodiment, the seal 818 may be used to hold the position of the cap 812 relative to the base 810. The seal 818 defines a locking feature and may be referred to hereinafter as locking feature 818. For example, the locking feature 818 may provide an interference fit with the cap 812 and/or the base 810. The locking feature may be manufactured from a material having a high coefficient of friction, such as rubber, to resist rotation of the cap 812. The locking feature 818 may provide sufficient locking force to overcome normal environmental forces, such as wind, snow, touching by animals, and the like. However, the locking force may be overcome if sufficient rotational pressure is applied, such as when an installer rotates the cap 812 or the photocell 106. As such, the installer may rotate the cap 812 to any angular position against the friction force of the locking feature 818.

The base 810 may include at least one anti-rotation post 832. When the cap 812 engages the anti-rotation posts 832, the cap 812 is restricted from rotating. The cap 812 may engage the anti-rotation posts 832 during mating of the photocell 106 to the cap 812 to allow rotation of the photocell 106 to a mated position without rotation of the cap 812. In alternative embodiments, the anti-rotation posts 832 may be provided on the cap 812 rather than the base 810. The base 810 may include an over-rotation feature 834 at the top. Optionally, a biasing member 868 may be positioned between the cap 812 and the base 810. The biasing member 868 may be biased against the cap 812 to force the cap 812 upward relative to the base 810, such as to hold the cap 812 out of engagement with the anti-rotation posts 832 in a normal position, in which the cap 812 is rotatable when the friction holding force of the locking feature 818 is overcome. The biasing member 868 may provide anti-rotational friction.

Figure 23:
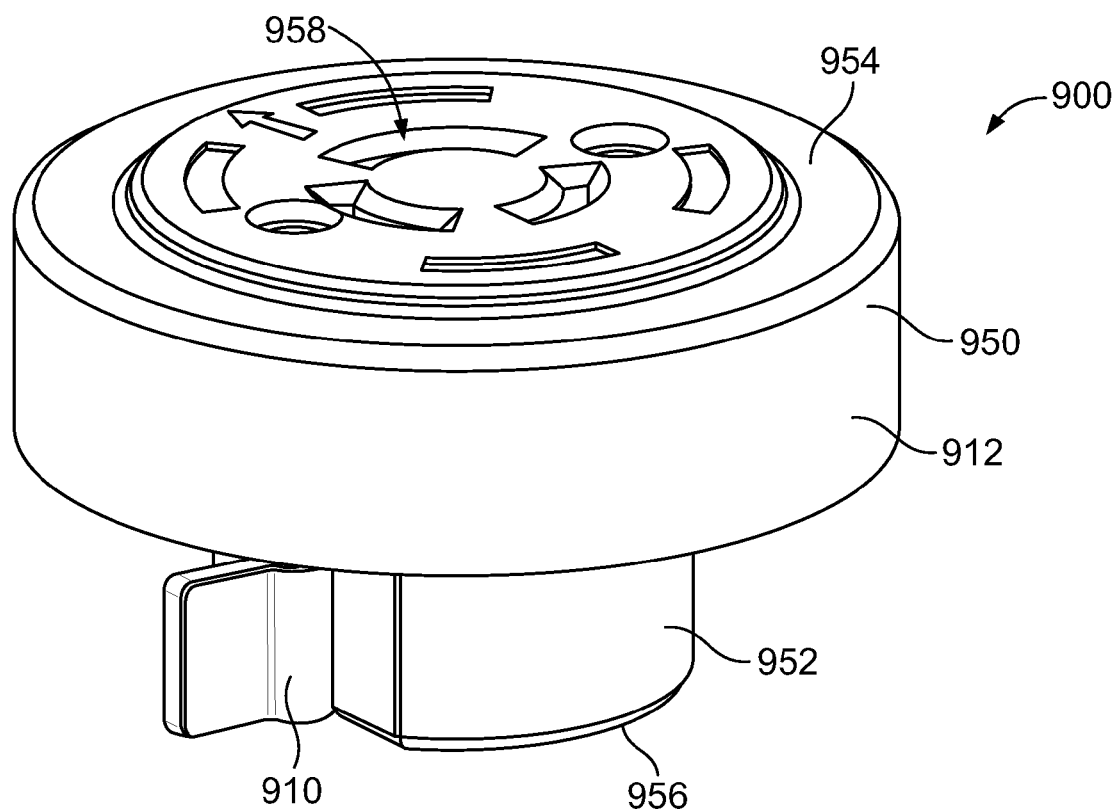
FIG. 23 is a top perspective view of a photocell receptacle formed in accordance with an exemplary embodiment.
Figure 24:
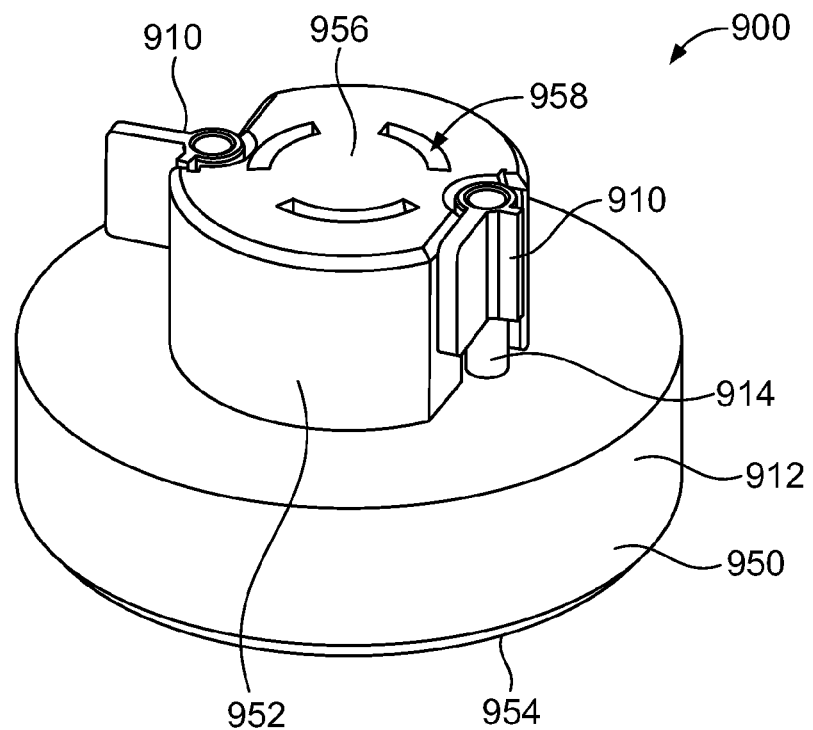
FIG. 24 is a bottom perspective view of the photocell receptacle shown in FIG. 23.
Figure 25:
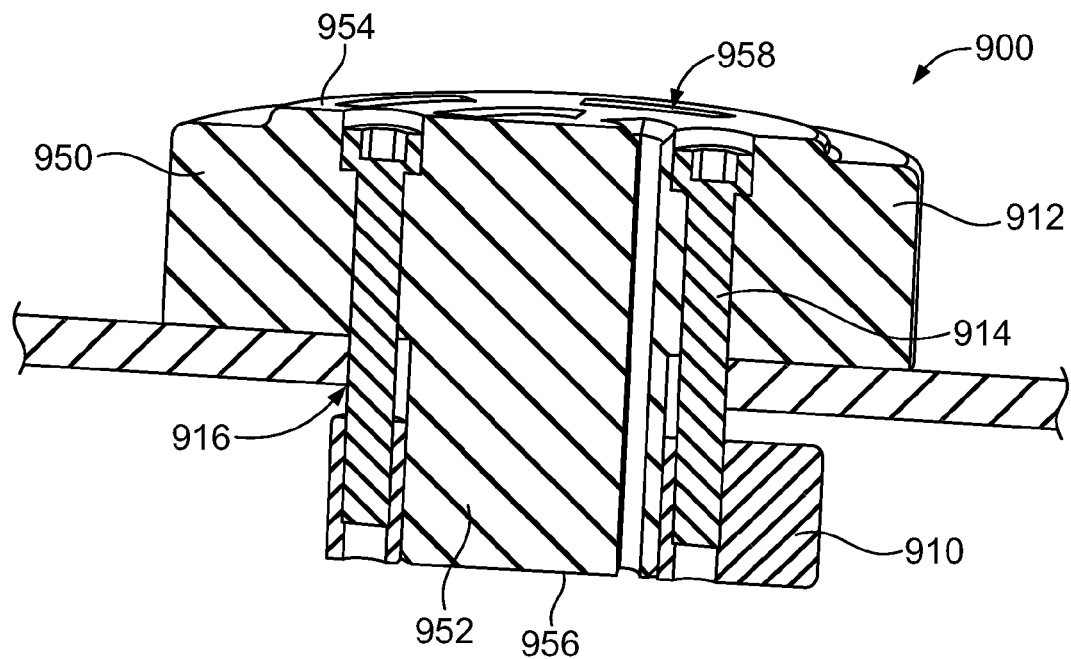
FIG. 25 is a cross sectional view of the photocell receptacle shown in FIG. 23.

FIG. 23 is a top perspective view of a photocell receptacle 900 formed in accordance with an exemplary embodiment. FIG. 24 is a bottom perspective view of the photocell receptacle 900. FIG. 25 is a cross sectional view of the photocell receptacle 900.

The photocell receptacle 900 is similar to the photocell receptacles 100, 200, 300, 400, 500, 600, 700, 800 in some aspects. The photocell receptacle 900 receives the photocell 106 (shown in FIG. 1), such as described above with respect to the photocell receptacle 200. The photocell receptacle 900 includes a base 910 and a cap 912 that are rotatably coupled together. The cap 912 is positionable at different angular positions relative to the housing 102 of the light fixture 104 to control an angular orientation of the photocell 106.

The base 910 is coupled to the cap 912 by threaded fasteners 914. Optionally, multiple bases 910 may be coupled to the cap 912. The bases 910 may define wings that are configured to be rotated between unlocked and locked positions. In the unlocked position, the base 910 is folded flat against the cap 912 so that the base 910 can be loaded into the housing 102 with the cap 912. The base 910 may then be rotated away from the cap 912 to the locked position. In the locked position, the base 910 is configured to engage the housing 102. For example, as the fastener 914 is tightened, the base 910 is pulled against the housing 102 to capture the housing 102 between the cap 912 and the base 910. Optionally, a seal (not shown) may be provided between the base 910 and the housing 102 to seal the light fixture 104 from environmental containments such as water, debris, and the like.

The base 910 defines a locking feature and may be referred to hereinafter as a base locking feature 910 used to lock the cap 912 relative to the housing 102. The cap 912 may be positioned at any angular position relative to the housing 102 prior to the base locking feature 910 being secured to the housing 102 to allow for positioning of the cap 912 at different angular positions relative to the housing 102.

The cap 912 has a head 950 and a neck 952 extending from the head 950. The head 950 is provided at a top 954 of the cap 912. The neck 952 is provided at a bottom 956 of the cap 912. The neck 952 is configured to be received through an opening 916 in the housing 102. The head 950 has a larger diameter than the neck 952. In an exemplary embodiment, the head 950 and neck 952 are circular to allow easy rotation of the cap 912 relative to the housing 102. However, other shapes are possible in alternative embodiment. The cap 912 has a plurality of contact channels 958 extending through the head 950 and/or the neck 952.

In an exemplary embodiment, the fasteners 914 define locking features for the cap 912 and may be referred to hereinafter as cap locking features 914. The cap locking features 914 are configured to engage corresponding base locking features 910 to lock the cap 912 to the housing 102. When the cap 912 is coupled to the housing 102, the cap 912 is unable to rotate relative to the housing 102. The angular position of the cap 912 relative to the housing 102 is fixed when the cap 912 is locked to the base 910.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A photocell receptacle comprising:
    a base configured to be fixedly mounted to a housing of a light fixture, the base having an opening providing access to the interior of the housing of the light fixture, the base having a base locking feature;
    a cap having a cap locking feature, the cap locking feature operably engaging the base locking feature to secure the cap to the base, the cap being variably positionable and lockable when the cap locking feature engages the base locking feature at different angular positions relative to the base to change an angular orientation of the cap relative to the housing of the light fixture, the cap having contact channels holding electrical contacts configured to be electrically connected to corresponding contacts of a photocell.

2. The photocell receptacle of claim 1, wherein the base locking feature is one of a plurality of base locking features, the cap locking feature being engagable with the plurality of base locking features to change the angular position of the cap relative to the base.

3. The photocell receptacle of claim 1, wherein the base locking feature includes a notch, the cap locking feature includes a protrusion received in the notch to stop rotation of the cap relative to the base.

4. The photocell receptacle of claim 3, wherein the notch comprises a bayonet-style notch with a locking cavity, the protrusion being locked in the locking cavity.

5. The photocell receptacle of claim 1, wherein the base locking feature includes a protrusion, the cap locking feature includes a notch receiving the protrusion to stop rotation of the cap relative to the base.

6. The photocell receptacle of claim 1, wherein the base includes a latch coupled to the cap to axially secure the cap relative to the base, the cap locking feature and base locking feature being engaged to rotatably secure the cap relative to the base.

7. The photocell receptacle of claim 1, further comprising a biasing member between the base and the cap, the biasing member biasing the cap into a locked positioned in which the cap locking feature engages the base locking feature.

8. The photocell receptacle of claim 1, wherein the base locking feature comprises a plurality of teeth with spaces between the teeth, the cap locking feature comprising a protrusion selectively receivable in the spaces to control the angular position of the cap relative to the base.

9. The photocell receptacle of claim 8, wherein the cap locking feature comprises a plurality of teeth internested with the teeth of the base locking feature.

10. The photocell receptacle of claim 1, wherein the base comprises a top and a bottom, the bottom being mounted to the housing of the light fixture, the base comprising a ledge having a bottom surface, the base locking feature comprising a plurality of notches in the bottom surface of the ledge, the cap locking feature comprising a protrusion selectively receivable in the notches to control the angular position of the cap relative to the base.

11. The photocell receptacle of claim 10, further comprising a biasing member between the base and the cap, the biasing member pressing the cap upward relative to the base to force the protrusion into the associated notch.

12. The photocell receptacle of claim 1, wherein the base comprises a plurality of anti-rotation posts extending from the top, the cap comprising a plurality of anti-rotation bores that receive corresponding anti-rotation posts to resist rotation of a cap relative to the base.

13. The photocell receptacle of claim 12, further comprising a biasing member between the base and the cap, the biasing member normally pressing the cap away from the top of the base such that the anti-rotation posts are disengaged from the anti-rotation bores.

14. The photocell receptacle of claim 1, wherein the cap comprises a head and a neck extending from the head, the contact channels being open at a top of the head to receive the electrical contacts and the corresponding contacts of the photocell, the neck being received in the opening of the base, the cap locking feature provided on the head.

15. The photocell receptacle of claim 1, further comprising a seal positioned in the opening between the cap and the base.

16. The photocell receptacle of claim 1, further comprising an over-rotation feature on at least one of the base and the cap to limit rotation of the cap relative to the base to less than 360°.

17. The photocell receptacle of claim 1, further comprising a retention clip held by the base, the cap having a first clip groove and a second clip groove vertically offset from the first clip groove, the cap being positionable in an unlocked position in which the first clip groove receives the retention clip and a locked position in which the second clip groove receives the retention clip, the cap locking feature engaging the base locking feature in the locked position to limit rotation of the cap with respect to the base, the cap locking feature being disengaged from the base locking feature in the unlocked position allowing rotation of the cap with respect to the base.

18. The photocell receptacle of claim 1, further comprising a biasing member coupled to the cap and positioned in the housing of the light fixture, the biasing member being configured to engage the housing to bias the cap to a locked positioned in which the cap locking feature engages the base locking feature.

19. The photocell receptacle of claim 1, further comprising a direction indicator on a top of the cap, the cap being rotated until the direction indicator is positioned generally north.

* * * * *